(12) United States Patent
Nakatsu

(10) Patent No.: US 10,046,643 B2
(45) Date of Patent: Aug. 14, 2018

(54) BRAKING FORCE CONTROL APPARATUS FOR A VEHICLE

(71) Applicant: TOYOTA JIDOSHA KABUSHIKI KAISHA, Toyota-shi, Aichi-ken (JP)

(72) Inventor: Masatoshi Nakatsu, Susono (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 252 days.

(21) Appl. No.: 14/953,582

(22) Filed: Nov. 30, 2015

(65) Prior Publication Data

US 2016/0159225 A1 Jun. 9, 2016

(30) Foreign Application Priority Data

Dec. 4, 2014 (JP) .................. 2014-246141

(51) Int. Cl.
*B60L 7/26* (2006.01)
*B60L 7/18* (2006.01)
*B60T 8/1761* (2006.01)
*B60T 1/10* (2006.01)
*B60T 8/1755* (2006.01)
*B60L 3/10* (2006.01)
*B60L 15/20* (2006.01)

(52) U.S. Cl.
CPC ........ *B60L 7/26* (2013.01); *B60L 3/10* (2013.01); *B60L 7/18* (2013.01); *B60L 15/2009* (2013.01); *B60T 1/10* (2013.01); *B60T 8/1755* (2013.01); *B60T 8/17616* (2013.01); *B60T 2270/604* (2013.01); *B60T 2270/613* (2013.01); *Y02T 10/645* (2013.01); *Y02T 10/648* (2013.01); *Y02T 10/72* (2013.01); *Y02T 10/7275* (2013.01)

(58) Field of Classification Search
None
See application file for complete search history.

(56) References Cited

U.S. PATENT DOCUMENTS

| | | | |
|---|---|---|---|
| 2008/0079311 A1 | 4/2008 | Schneider et al. | |
| 2015/0019058 A1* | 1/2015 | Georgiev | |
| 2015/0274019 A1* | 10/2015 | Matsuda | ............... B62K 11/04 701/22 |

FOREIGN PATENT DOCUMENTS

| | | |
|---|---|---|
| JP | 5-161211 A | 6/1993 |
| JP | 2001039281 A | 2/2001 |
| JP | 2008301590 A | 12/2008 |
| JP | 2009189121 A | 8/2009 |
| JP | 2012-60753 A | 3/2012 |
| JP | 2013-179728 A | 9/2013 |

(Continued)

*Primary Examiner* — Todd Melton
*Assistant Examiner* — Jason R Roberson
(74) *Attorney, Agent, or Firm* — Sughrue Mion, PLLC

(57) ABSTRACT

In order to enable satisfactory vehicle motion control to be carried out while wheels (10) are being braked, on a vehicle in which each of the wheels (10) is braked by a regenerative braking force by a motor (30) and a friction braking force by a friction brake mechanism (40), a brake ECU (53) acquires at least one parameter out of a steering angle, a steering velocity, a lateral acceleration of a vehicle body, a yaw rate of the vehicle body, a sprung vertical acceleration, and an unsprung vertical acceleration, and when a magnitude of the parameter is more than a threshold, decreases a ratio of the regenerative braking force out of a driver-requested braking force, and increases a ratio of the friction braking force.

8 Claims, 18 Drawing Sheets

(56) References Cited

FOREIGN PATENT DOCUMENTS

| JP | 2013180670 A | 9/2013 | | |
|---|---|---|---|---|
| JP | 2013-256253 A | 12/2013 | | |
| JP | 2014-19247 A | 2/2014 | | |
| WO | WO-2014064730 A1 | * | 5/2014 | ............. B62K 11/04 |

* cited by examiner

BRAKING FORCE CONTROL APPARATUS FOR A VEHICLE

BACKGROUND OF THE INVENTION

1. Field of the Invention

The present invention relates to a braking force control apparatus for a vehicle, which is configured to brake a wheel by using both of a regenerative brake using an electric power generation operation of a motor and a mechanical brake using application of a mechanical resistance.

2. Description of the Related Art

Hitherto, there has been known a vehicle configured to use a motor to generate a driving force and a braking force (referred to as braking/driving force) on a wheel. In this type of vehicle, both of a friction braking force and a regenerative braking force are used to brake the wheel. The friction braking force is generated by using a hydraulic pressure to bring brake pads into contact with a disc (or a drum), and the regenerative braking force is generated by recovering electric power, which is generated by using the motor for driving the wheel to act as an electric power generator, to a battery. An apparatus proposed in Japanese Patent Application Laid-open No. Hei 05-161211 is configured to prioritize the regenerative braking over the friction braking in order to exert an energy recovery effect through the regenerative braking.

The braking/driving force on the wheel is converted into a force in a vertical direction of a vehicle body by a suspension. Thus, in a vehicle including a motor as a braking/driving power source for a wheel, a motion state of the vehicle can be controlled by controlling the braking/driving force of each of the motors. In a vehicle of an in-wheel motor type in which a motor is arranged inside or near each of the front/rear wheels, vehicle motions such as a roll motion, a yaw motion, a pitch motion, and a heave motion of the vehicle body can be controlled by applying power running control or regenerative control to each of the motors. Moreover, also in a vehicle in which the left and right wheels of the front wheels or the rear wheels are independently driven by motors, the roll motion, the yaw motion, the pitch motion, and the like can be controlled by controlling the braking/driving forces of the motors. Moreover, also in a vehicle in which the left and right wheels of the front wheels or the rear wheels are driven by a common motor, the pitch motion can be controlled by controlling the braking/driving force of the motor.

When the vehicle motion control is carried out, and an operation by a driver is an accelerator pedal operation, a target braking/driving force generated on the wheel by a motor can be calculated as a sum of a driver-requested driving force based on an accelerator operation amount and a control braking/driving force required for carrying out the vehicle motion control. On the other hand, when the operation by the driver is a brake pedal operation, a driver-requested braking force based on a brake operation amount is set, and the driver-requested braking force is distributed to a requested friction braking force and a requested regenerative braking force. The target braking/driving force to be generated by the motor on the wheel can be calculated as a sum of the requested regenerative braking force and the control braking/driving force required for the vehicle motion control. Even during the brake operation, the vehicle motion control can be carried out by controlling an operation of the motor based on the target braking/driving force.

There is a limit to regeneration performance. Therefore, during the brake pedal operation, the control braking/driving force that can be generated by the motor, and can be used for the vehicle motion control is limited to a range acquired by excluding the requested regenerative braking force required for decelerating the vehicle from the maximum braking force that can be generated by the motor. Thus, as the requested regenerative braking force increases, a margin of the control braking/driving force that can be used for the vehicle motion control decreases. Under the state in which the margin of the control braking/driving force is decreased, the target driving force of the motor is liable to reach a performance limit, and satisfactory vehicle motion control may not be carried out.

SUMMARY OF THE INVENTION

The present invention has been made in view of the above-mentioned problem, and therefore has an object to enable satisfactory vehicle motion control to be carried out during braking of wheels.

In order to attain the above-mentioned object, a feature of one embodiment of the present invention resides in a braking force control apparatus for a vehicle, including:

a motor (30) for transmitting a drive torque and a regenerative braking torque to a wheel, to thereby generate a braking/driving force on the wheel;

a mechanical brake device (40, 45) for applying a mechanical resistance to the wheel, to thereby generate a braking force on the wheel;

requested braking force distribution means (53, S24) for distributing, in accordance with a distribution characteristic, a total requested braking force requested in order to decelerate the vehicle to a requested regenerative braking force to be generated by the motor, and a requested mechanical braking force to be generated by the mechanical brake device;

motor control means (51, 52, S41) for calculating a target braking/driving force for the wheel to be generated by the motor based on the requested regenerative braking force distributed by the requested braking force distribution means and a control braking/driving force required for vehicle motion control, and controlling an operation of the motor based on the target braking/driving force;

mechanical brake control means (53, S30) for controlling an operation of the mechanical brake device based on the requested mechanical braking force;

determination means (S101 to S103) for determining whether or not a specific state in which a control braking/driving force that is generatable by the motor is liable to be insufficient for the control braking/driving force required for the vehicle motion control has occurred; and distribution characteristic change means (S111 to S113) for changing, when the specific state is determined to have occurred under a state in which the total requested braking force is generated, the distribution characteristic so that, compared with a state in which the specific state is not determined to have occurred, the distribution to the requested regenerative braking force out of the total requested braking force determined by the distribution characteristic decreases and the distribution to the requested mechanical braking force determined by the distribution characteristic increases.

In this case, the determination means is preferably configured to acquire an index for predicting the occurrence of the specific state, and determine, based on the index, whether or not the specific state has occurred.

The braking force control apparatus for a vehicle according to the one embodiment of the present invention includes the motor for transmitting the drive torque and the regenerative braking torque to the wheel, to thereby generate the braking/driving force on the wheel, and the mechanical brake device for applying the mechanical resistance to the wheel, to thereby generate the braking force on the wheel. Thus, the wheel can be braked by the regenerative braking force of the motor and the mechanical braking force (such as a braking force generated through a friction) of the mechanical braking device.

The requested braking force distribution means distributes, in accordance with the distribution characteristic, the total requested braking force requested in order to decelerate the vehicle to the requested regenerative braking force to be generated by the motor, and the requested mechanical braking force to be generated by the mechanical brake device. The motor control means calculates the target braking/driving force for the wheel to be generated by the motor based on the requested regenerative braking force distributed by the requested braking force distribution means and the control braking/driving force required for the vehicle motion control, and controls the operation of the motor based on the target braking/driving force. The mechanical brake control means controls the operation of the mechanical brake device based on the requested mechanical braking force.

The wheel is coupled to the vehicle body via a suspension, and hence the braking/driving force of the wheel driven by the motor is converted by the suspension into a force urging the vehicle body in a vertical direction. Thus, the vehicle motion can be controlled by controlling the braking/driving torque of the motor. For example, at least one of a pitch motion, a roll motion, a heave motion, or a yaw motion of the vehicle can be controlled.

As the requested regenerative braking force increases, the margin of the control braking/driving force that can be used for the vehicle motion control decreases. Under the state in which the margin of the control braking/driving force is decreased, satisfactory vehicle motion control may not be carried out. Thus, according to the one embodiment of the present invention, the braking force control apparatus for a vehicle includes the determination means and the distribution characteristic change means.

The determination means determines whether or not the specific state in which the control braking/driving force that is generatable by the motor is liable to be insufficient for the control braking/driving force required for the vehicle motion control has occurred. For example, the determination means acquires the index for predicting the occurrence of the specific state, and determines, based on the index, whether or not the specific state has occurred. The distribution characteristic change means changes, when the specific state is determined to have occurred under the state in which the total requested braking force is generated, the distribution characteristic so that, compared with the state in which the specific state is not determined to have occurred, the distribution to the requested regenerative braking force out of the total requested braking force determined by the distribution characteristic decreases and the distribution to the requested mechanical braking force determined by the distribution characteristic increases. In other words, a part or an entirety of the requested regenerative braking force is replaced by the requested mechanical braking force.

Thus, according to the one embodiment of the present invention, under the specific state in which the control braking/driving force that is generatable by the motor is liable to be insufficient for the control braking/driving force required for the vehicle motion control, the distribution to the requested regenerative braking force out of the total requested braking force is decreased (the distribution to the requested mechanical braking force out of the total requested braking force is increased). Hence, the margin for generating the control braking/driving force required for the vehicle motion control can be increased, and satisfactory vehicle motion control can be carried out.

One aspect of the present invention resides in that the determination means is configured to acquire, as the index, a vehicle state parameter (P) representing a motion state of the vehicle or affecting the motion state.

Whether or not the specific state in which the control braking/driving force that is generatable by the motor is liable to be insufficient has occurred can be determined based on the vehicle state parameter representing the motion state of the vehicle or affecting the motion state. Thus, according to the one aspect of the present invention, the determination means acquires the vehicle state parameter representing the motion state of the vehicle or affecting the motion state. Thus, the occurrence of the specific state can be easily determined.

One aspect of the present invention resides in that the determination means is configured to acquire, as the vehicle state parameter, at least one of a steering angle, a steering velocity, a lateral acceleration of a vehicle body, a yaw rate of the vehicle body, a sprung vertical acceleration, or an unsprung vertical acceleration, and determine that the specific state has occurred when a magnitude of the acquired vehicle state parameter is more than a determination threshold.

When at least one of the steering angle, the steering velocity, the lateral acceleration of the vehicle body, the yaw rate of the vehicle body, the sprung vertical acceleration, and the unsprung vertical acceleration is large, it can be estimated that a degree of necessity for the vehicle motion control is high, and the specific state occurs. Thus, according to the one aspect of the present invention, the determination means acquires, as the vehicle state parameter, at least one of the steering angle, the steering velocity, the lateral acceleration of the vehicle body, the yaw rate of the vehicle body, the sprung vertical acceleration, and the unsprung vertical acceleration. When the magnitude of the acquired vehicle state parameter is more than the determination threshold, the determination means determines that the specific state has occurred. When the specific state is determined to have occurred, the distribution characteristic change means decreases the distribution to the requested regenerative braking force out of the total requested braking force (increases the distribution to the requested mechanical braking force out of the total requested braking force). Thus, the margin for generating the control braking/driving force for the vehicle motion control can be increased, and satisfactory vehicle motion control can be carried out.

One aspect of the present invention resides in that the vehicle motion control includes at least one of sprung vibration suppression control of suppressing a vibration in a vertical direction of the vehicle body, roll motion control of suppressing a motion in a roll direction of the vehicle body, yaw motion control of controlling a motion in a yaw direction of the vehicle body, and pitch motion control of controlling a motion in a pitch direction of the vehicle body.

For example, when the magnitude of at least one parameter out of the steering angle, the steering velocity, the lateral acceleration of the vehicle body, and the yaw rate of the vehicle body is more than the determination threshold, a degree of necessity for the yaw motion control or the roll motion control increases. Moreover, when the magnitude of at least one parameter out of the sprung vertical acceleration and the unsprung vertical acceleration is more than the determination threshold, a degree of necessity for the sprung vibration suppression control or the pitch motion control increases. According to the one aspect of the present invention, when the magnitude of the vehicle state parameter increases, and the degree of necessity for the vehicle motion control increases, the distribution to the requested regenerative braking force out of the total requested braking force is decreased (the distribution to the requested mechanical braking force out of the total requested braking force is increased). Thus, at least one of the sprung vibration suppression control, the roll motion control, the yaw motion control, and the pitch motion control can be satisfactorily carried out.

One aspect of the present invention resides in a braking force control apparatus for a vehicle, further including motor margin degree acquisition means (S121) for acquiring a margin degree (A) based on a margin of the regenerative braking torque that is additionally generatable by the motor, in which the distribution characteristic change means is configured to change, even when the specific state is not determined to have occurred, when the margin degree is less than a margin degree threshold set in advance, the distribution characteristic so that the distribution to the requested regenerative braking force out of the total requested braking force determined by the distribution characteristic decreases and the distribution to the requested mechanical braking force determined by the distribution characteristic increases (S131, S132).

According to the one aspect of the present invention, the motor margin degree acquisition means acquires the margin degree based on the margin of the regenerative braking torque that is additionally generatable by the motor. The distribution characteristic change means changes, even when the specific state is not determined to have occurred, when the margin degree is less than the margin degree threshold set in advance, the distribution characteristic so that the distribution to the requested regenerative braking force out of the total requested braking force determined by the distribution characteristic decreases, and the distribution to the requested mechanical braking force determined by the distribution characteristic increases. Thus, the margin for generating the control braking/driving force required for the vehicle motion control can be increased, and satisfactory vehicle motion control can be carried out. Note that, the margin degree may be any one of information representing an abundance of the margin of the regenerative braking torque that can be additionally generated by the motor and information representing a scarcity thereof.

One aspect of the present invention resides in that:
the determination means is configured to acquire at least the steering angle as the vehicle state parameter, and determine that the specific state has occurred when the steering angle is more than a first threshold (Pon) as the determination threshold; and
the distribution characteristic change means is configured to wait, after the specific state is determined to have occurred, when the steering angle is equal to or less than a second threshold set to be a value less than the first threshold (Poff), until a state in which the steering angle is not more than the first threshold continues after the steering angle becomes equal to or less than the second threshold, for at least a set delay period set in advance, and start an increase in the distribution to the requested regenerative braking force and a decrease in the distribution to the requested mechanical braking force so that the distribution characteristic becomes the distribution characteristic before the change in the distribution characteristic (S104, S105, S107, S108, S115).

According to the one aspect of the present invention, the determination means acquires at least the steering angle as the vehicle state parameter, and determines that the specific state has occurred when the steering angle is more than the first threshold as the determination threshold. Based on the relationship in the magnitude between the steering angle and the determination threshold, the occurrence of the specific state and an end of the specific state can be determined. However, even when the steering angle decreases below the determination threshold, the yaw motion of the vehicle does not always settle at this time point, and a certain period is necessary until the yaw motion settles. Moreover, when a lane change is carried out, the steering angle crosses a zero point (neutral position) to an opposite direction. In this case, the direction of adjusting the distribution between the requested regenerative braking force and the requested mechanical braking force is switched after a short period, which may cause the driver to feel a sense of discomfort.

Thus, according to the one aspect of the present invention, the distribution characteristic change means waits, after the specific state is determined to have occurred, when the steering angle becomes equal to or less than the second threshold set to be the value less than the first threshold, until the state in which the steering angle is not more than the first threshold continues after the steering angle becomes equal to or less than the second threshold, for at least the set delay period set in advance, and starts an increase in the distribution to the requested regenerative braking force and a decrease in the distribution to the requested mechanical braking force so that the distribution characteristic becomes the distribution characteristic before the change in the distribution characteristic. Thus, according to the one aspect of the present invention, the distribution adjustment between the requested regenerative braking force and the requested mechanical braking force can be stably carried out, and the driver can be prevented from feeling a sense of discomfort.

One aspect of the present invention resides in that the determination means is configured to acquire, as the index, a magnitude of the control braking/driving force required for the vehicle motion control, and determine that the specific state has occurred when the magnitude of the control braking/driving force is more than a determination threshold.

When the control braking/driving force required for the vehicle motion control increases, the control braking/driving force that can be generated by the motor is liable to become insufficient. Thus, according to the one aspect of the present invention, the determination means acquires the magnitude of the control braking/driving force required for the vehicle motion control, and determines that the specific state has occurred when the magnitude of the control braking/driving force is more than the determination threshold. Thus, the occurrence of the specific state can be easily determined.

One aspect of the present invention resides in that the distribution characteristic change means is configured to change the distribution characteristic so that, as the index increases, the distribution to the requested regenerative braking force out of the total requested braking force decreases, and the distribution to the requested mechanical braking force determined by the distribution characteristic increases (S173).

As the vehicle state parameter increases, and as the control braking/driving force required for the vehicle motion control increases, the control braking/driving force that can be generated by the motor is liable to become insufficient.

Thus, according to the one aspect of the present invention, the distribution characteristic change means changes the distribution characteristic so that, as the index increases, the distribution to the requested regenerative braking force out of the total requested braking force decreases, and the distribution to the requested mechanical braking force determined by the distribution characteristic increases. Thus, the vehicle motion control can be more appropriately carried out.

One aspect of the present invention resides in a braking force control apparatus for a vehicle, further including:

lock state detection means (S141, S142, S143) for detecting a lock state representing a state in which the wheel is estimated to tend to be locked; and lock state distribution characteristic change means (S155, S156) for starting, under a state in which the distribution characteristic is changed by the distribution characteristic change means, when the lock state is detected by the lock state detection means, an increase in the distribution to the requested regenerative braking force, and a decrease in the distribution to the requested mechanical braking force.

Under a state in which a grip force of a tire is approaching a limit during the braking, even when the distribution to the requested regenerative braking force out of the total requested braking force is decreased to provide a margin to the motor, satisfactory vehicle motion control cannot be carried out. Thus, according to the one aspect of the present invention, the lock state detection means detects the lock state representing the state in which the wheel is estimated to tend to be locked. The state in which "the wheel tends to be locked" includes a state in which the wheel is locked. The lock state distribution characteristic change means starts, under the state in which the distribution characteristic is changed by the distribution characteristic change means, when the lock state is detected by the lock state detection means, an increase in the distribution to the requested regenerative braking force, and a decrease in the distribution to the requested mechanical braking force. Thus, according to the one aspect of the present invention, a kinetic energy of the wheel to be originally lost by the mechanical braking can be efficiently recovered to a battery through the regenerative braking.

One aspect of the present invention resides in that the motor is provided so as to transmit the driving torque and the regenerative braking torque independently to each of a front left wheel, a front right wheel, a rear left wheel, and a rear right wheel.

According to the one aspect of the present invention, the braking/driving force can be independently generated on each of the front/rear left/right wheels, and hence the yaw motion, the roll motion, the pitch motion, and the heave motion of the vehicle can be satisfactorily controlled.

In the description above, a reference symbol used in an embodiment of the present invention is enclosed in parentheses and assigned to each constituent feature of the invention corresponding to the embodiment in order to facilitate the understanding of the invention, but each constituent feature of the invention is not limited to that of the embodiment prescribed by the reference symbol.

DETAILED DESCRIPTION OF THE PREFERRED EMBODIMENTS

Figure 1:
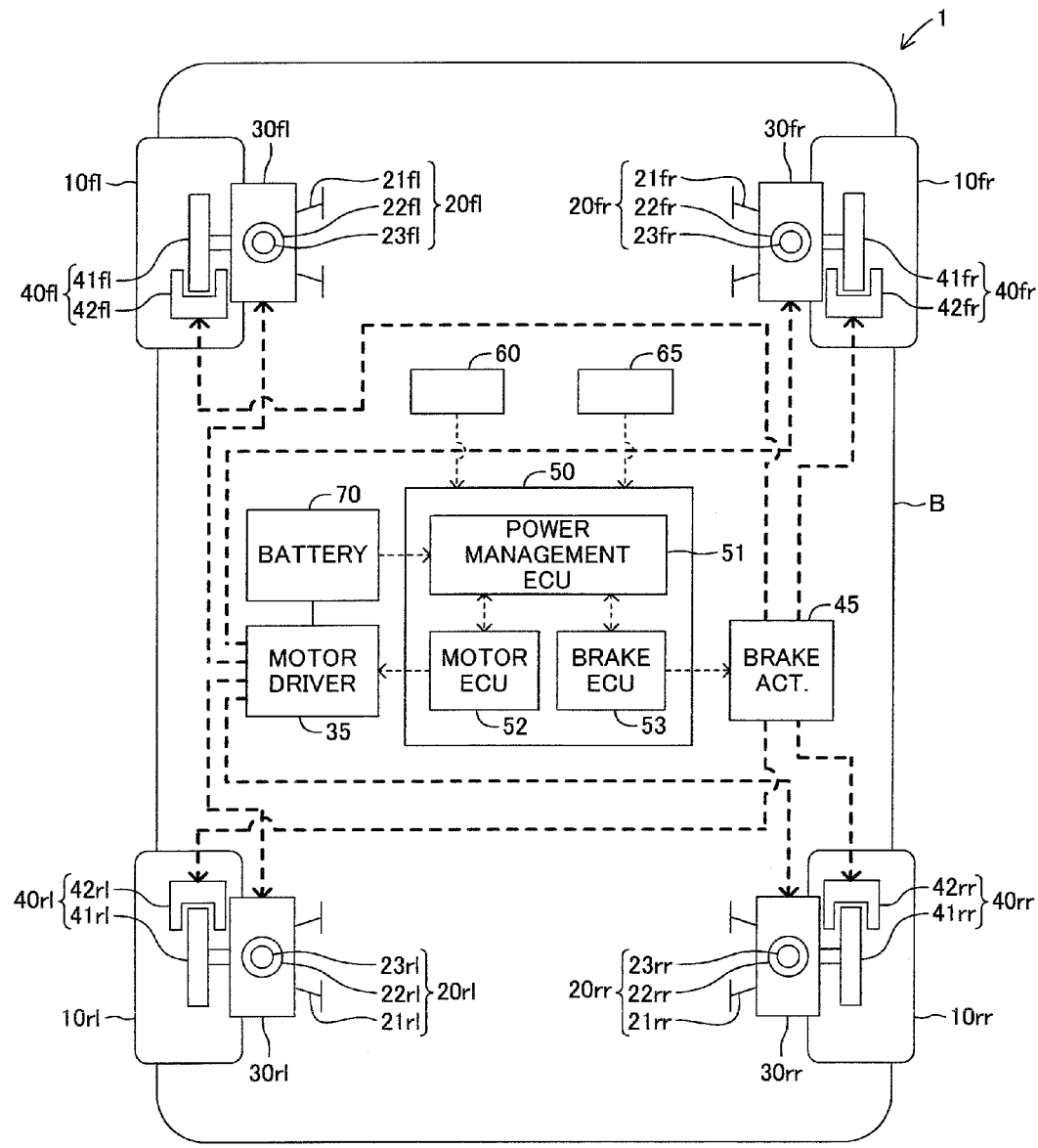
FIG. 1 is a schematic configuration diagram of a vehicle on which a braking force control apparatus for a vehicle according to an embodiment of the present invention is installed.

A detailed description is now given of an embodiment of the present invention referring to the drawings. FIG. 1 is a schematic illustration of a configuration of a vehicle 1 on which a braking force control apparatus for a vehicle according to this embodiment is mounted.

The vehicle 1 includes a front left wheel 10*fl*, a front right wheel 10*fr*, a rear left wheel 10*rl*, and a rear right wheel 10*rr*. The front left wheel 10*fl*, the front right wheel 10*fr*, the rear left wheel 10*rl*, and the rear right wheel 10*rr* are suspended to a vehicle body B via independent suspensions 20*fl*, 20*fr*, 20*rl*, and 20*rr*, respectively.

The suspensions 20*fl*, 20*fr*, 20*rl*, and 20*rr* are coupling structures for coupling the vehicle body B and the wheels 10*fl*, 10*fr*, 10*rl*, and 10*rr* to each other, respectively, and include link mechanisms 21*fl*, 21*fr*, 21*rl*, and 21*rr* constructed by suspension arms and the like, suspension springs 22*fl*, 22*fr*, 22*rl*, and 22*rr* for supporting loads in the vertical direction and absorbing impact, and shock absorbers 23*fl*, 23*fr*, 23*rl*, and 23*rr* for attenuating a vibration of a sprung mass (vehicle body B). A publicly known four-wheel independent suspension such as a wishbone type suspension and a strut type suspension can be employed as the suspensions 20*fl*, 20*fr*, 20*rl*, and 20*rr*.

Motors 30*fl*, 30*fr*, 30*rl*, and 30*rr* are built into the inside of the front left wheel 10*fl*, the front right wheel 10*fr*, the rear left wheel 10*rl*, and the rear right wheel 10*rr*, respectively.

The motors 30*fl*, 30*fr*, 30*rl*, and 30*rr*, which are so-called in-wheel motors, are respectively arranged at unsprung locations of the vehicle 1 along with the front left wheel 10*fl*, the front right wheel 10*fr*, the rear left wheel 10*rl*, and the rear right wheel 10*rr*, and are coupled to the front left wheel 10*fl*, the front right wheel 10*fr*, the rear left wheel 10*rl*, and the rear right wheel 10*rr* so that motor torques can be transmitted to the respective wheels. In the vehicle 1, rotations of the respective motors 30*fl*, 30*fr*, 30*rl*, and 30*rr* can be independently controlled to independently control the driving forces and the braking forces to be generated on the front left wheel 10*fl*, the front right wheel 10*fr*, the rear left wheel 10*rl*, and the rear right wheel 10*rr*.

Moreover, in the front left wheel 10*fl*, the front right wheel 10*fr*, the rear left wheel 10*rl*, and the rear right wheel 10*rr*, friction brake mechanisms 40*fl*, 40*fr*, 40*rl*, and 40*rr* are respectively provided. The friction brake mechanisms 40*fl*, 40*fr*, 40*rl*, and 40*rr* respectively include brake disc rotors 41*fl*, 41*fr*, 41*rl*, and 41*rr* respectively rotating along with the front left wheel 10*fl*, the front right wheel 10*fr*, the rear left wheel 10*rl*, and the rear right wheel 10*rr*, and brake calipers 42*fl*, 42*fr*, 42*rl*, and 42*rr* The brake calipers 42*fl*, 42*fr*, 42*rl*, and 42*rr* are operated by wheel cylinders (not shown) operated by hydraulic pressures, to thereby press brake pads against the brake disc rotors 41*fl*, 41*fr*, 41*rl*, and 41*rr*.

Note that, a configuration provided for each wheel is denoted by reference numeral followed by a suffix "fl" for the front left wheel, a suffix "fr" for the front right wheel, a suffix "rl" for the rear left wheel, and a suffix "rr" for the rear right wheel, but in the following description, the suffix follows only when the wheel position needs to be identified. Moreover, when the front wheel and the rear wheel need to be identified, reference numeral is followed by "f" for the front wheel, and "r" for the rear wheel. In the drawings, the reference numeral is followed by the suffix for identifying the wheel position.

For example, brushless motors are used as the respective motors 30. The respective motors 30 are connected to a motor driver 35. The motor driver 35 includes, for example, inverters, and four sets of inverters are provided for the respective motors 30. The motor driver 35 converts DC power supplied from a battery 70 into AC power, and independently supplies the AC power to the respective motors 30. As a result, the driving of the respective motors 30 is independently controlled to generate torques to apply the driving forces to the respective wheels 10. Supplying the electric power to the motor 30 to generate the driving torque in this manner is referred to as power running.

Moreover, each motor 30 also functions as an electric power generator, and can generate electric power from rotational energy of each wheel 10, and recharge the battery 70 with the generated electric power via the motor driver 35. The braking torque generated by the electric power generation of the motor 30 applies the braking force to the wheel 10. When the driving force and the braking force do not need to be distinguished from each other, the driving force and the braking force are hereinafter generally referred to as braking/driving force. When a force needs to be identified as a driving force, the force is referred to as driving force. When a force needs to be identified as a braking force, the force is referred to as braking force.

Each friction brake mechanism 40 is connected to a brake actuator 45. The brake actuator 45 is an actuator for adjusting a hydraulic pressure supplied to the wheel cylinder built into the friction brake mechanism 40. The brake actuator 45 is publicly known, and is thus not described in detail, but, for example, includes a hydraulic circuit for supplying the hydraulic pressure to the wheel cylinder of the friction brake mechanism 40, a master cylinder for pressurizing a working fluid by a stepping force on a brake pedal, a power hydraulic pressure generation device including a booster pump and the like, for generating a high hydraulic pressure independently of the brake pedal stepping force, a linear control valve for adjusting the hydraulic pressure output by the power hydraulic pressure generation device to control the hydraulic pressure to maintain a target hydraulic pressure, on-off control valves each for opening/closing a hydraulic circuit for independently supplying the hydraulic pressure to the wheel cylinder of each wheel, and a hydraulic pressure sensor for detecting the hydraulic pressure of the hydraulic circuit.

The brake actuator 45 includes this configuration, and can thus control the braking force of each wheel 10. Note that, applicable examples of the brake actuator 45 include, a brake actuator (Japanese Patent Application Laid-open No. 2014-19247) including linear control valves capable of independently controlling wheel cylinder pressures of the front/rear left/right wheels 10 and a brake actuator (Japanese Patent Application Laid-open No. 2013-256253) including linear control valves capable of controlling the wheel cylinder pressures of the front/rear left/right wheels 10 in common.

The motor driver 35 and the brake actuator 45 are connected to an integrated electronic control unit 50. The integrated electronic control unit 50 (hereinafter referred to as integrated ECU 50) comprises a power management ECU 51, a motor ECU 52, and a brake ECU 53. The power management ECU 51 (hereinafter referred to as power ECU 51) is connected to the motor ECU 52 and the brake ECU 53 so as to be able to mutually communicate to/from the motor ECU 52 and the brake ECU 53. The integrated ECU 50 (the power ECU 51, the motor ECU 52, and the brake ECU 53) includes a microcomputer constructed by a CPU, a ROM, a RAM, and the like as a principal part, and executes various programs to control the operation of the motors 30 and the friction brake mechanisms 40.

The integrated ECU 50 is connects an operation state detection device 60 for detecting an operation state of operation performed by a driver to control the vehicle to travel and a motion state detection device 65 for detecting a motion state of the vehicle, and is configured to be input detection signals output from the detection devices 60 and 65.

The operation state detection device 60 is constructed by an accelerator sensor for detecting an accelerator operation amount by the driver based on a depressing amount (or an angle or a pressure) of an accelerator pedal, a brake sensor for detecting a brake operation amount by the driver based on a depressing amount (or an angle or a pressure) of a brake pedal, a steering angle sensor for detecting a steering operation amount of an operation on a steering wheel by the driver, a shift position sensor for detecting a shift position, and the like. The motion state detection device 65 includes wheel speed sensors each for detecting a wheel speed, which is a rotational speed of each wheel 10, a vehicle speed sensor for calculating and detecting a vehicle speed, which is a travel speed of the vehicle body B, based on the wheel speeds of the four wheels, a yaw rate sensor for detecting a yaw rate of the vehicle body B, sprung vertical acceleration sensors each for detecting an acceleration in a vertical direction of the vehicle body B (sprung part) at each wheel position, a lateral acceleration sensor for detecting a lateral acceleration in a lateral direction of the vehicle body B, a pitch rate sensor for detecting a pitch rate of the vehicle body B, a roll rate sensor for detecting a roll rate of the vehicle body B, stroke sensors each for detecting a stroke amount of each suspension 20, and unsprung vertical acceleration sensors each for detecting a vertical acceleration in the vertical direction of the unsprung part of each wheel 10. A direction of a sensor value including a direction element is identified based on the sign thereof. When a magnitude of the sensor value is discussed, an absolute value of the sensor value is used.

The power ECU 51 is mainly responsible for processing of calculating a target control amount for each motor 30 and processing of monitoring a state of charge (SOC) of the battery 70, a terminal voltage of the battery, a current flowing through the battery, a temperature of the battery, and the like. The target control amount of each motor 30 is limited by those states of the battery 70. The power ECU 51 transmits the calculated target control amount of each motor 30 to the motor ECU 52.

The motor ECU 52 is responsible for processing of controlling current supply to each motor 30 based on the target control amount of each wheel 10 transmitted from the power ECU 51.

The brake ECU 53 is responsible for processing of calculating the target control amount of the braking force applied to each wheel 10 separately as a regenerative control amount by regenerative braking and a friction control amount by friction braking, processing of transmitting the target control amount relating to the regenerative braking to the power ECU 51, and processing of controlling the operation of the brake actuator 45 based on the target control amount relating to the friction braking.

A description is later given of detailed processing by the power ECU 51, the motor ECU 52, and the brake ECU 53.

A description is now given of a principle of using the braking/driving torque of each motor 30 to control the motion state of the vehicle.

Figure 2A:
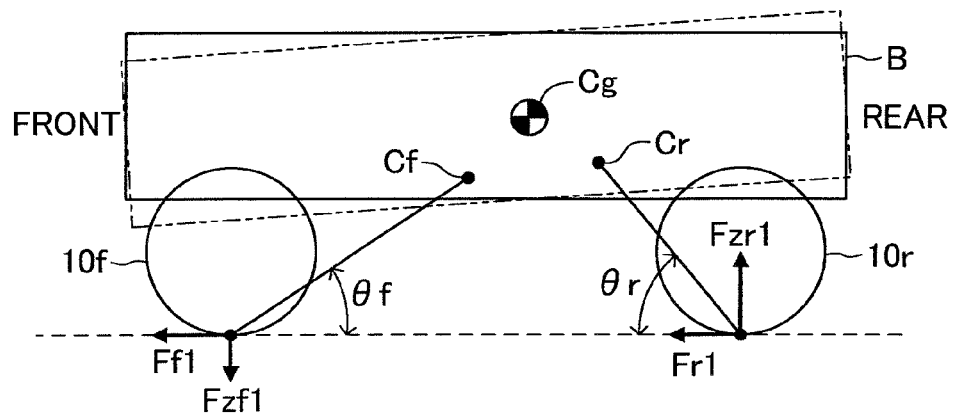
FIGS. 2A and 2B are diagrams for illustrating a relationship between a braking/driving force and a vertical force.
Figure 2B:
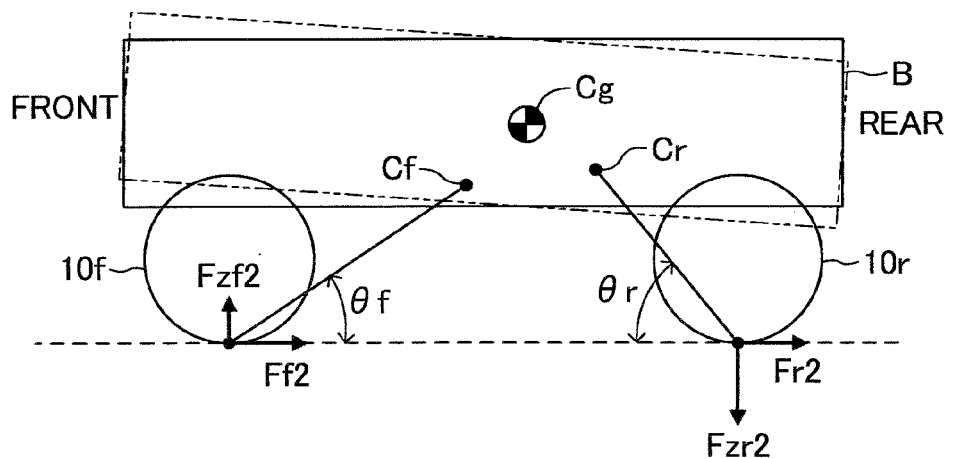

As illustrated in FIGS. 2A and 2B, the suspension 20 for suspending each wheel 10 is configured so that, in side view of the vehicle, an instantaneous rotation center Cf (an instantaneous center of the front wheel 10f with respect to the vehicle body B) of the front wheel suspension 20f is positioned behind and above the front wheel 10f, and an instantaneous rotation center Cr (an instantaneous center of the rear wheel 10r with respect to the vehicle body B) of the rear wheel suspension 20r is positioned ahead of and above the rear wheel 10r. Moreover, when an angle (smaller angle) formed by a ground horizontal surface and a line connecting between a ground contact point of the front wheel 10f and the instantaneous rotation center Cf is denoted by θf, and an angle (smaller angle) formed by the ground horizontal surface and a line connecting between a ground contact point of the rear wheel 10r and the instantaneous rotation center Cr is denoted by θr, such a relationship that θr is larger than θf is satisfied (θf<θr) in the vehicle of this embodiment. The relationship between θf and θr is not limited to this case, and may be an opposite or equal relationship.

In this configuration (geometry) of the suspension 20, when a driving torque is applied to the front wheel 10f, as illustrated in FIG. 2A, a force Ff1 forward in a travel direction of the vehicle acts at the ground contact point of the front wheel 10f, and a vertical force Fzf1 urging the vehicle body B downward is generated by the force Ff1 at the ground contact point of the front wheel 10f. Thus, the force in the direction of sinking the vehicle body B acts as a result of the driving of the front wheel 10f. In contrast, as illustrated in FIG. 2B, when a braking torque is applied to the front wheel 10f, a force Ff2 backward in the travel direction of the vehicle acts at the ground contact point of the front wheel 10f, and a vertical force Fzf2 urging the vehicle body B upward is generated by the force Ff2 at the ground contact point of the front wheel 10f. Thus, the force in the direction of raising the vehicle body B acts as a result of the braking of the front wheel 10f. Moreover, as illustrated in FIG. 2A, when a driving torque is applied to the rear wheel 10r, a force Fr1 forward in the travel direction of the vehicle acts at a ground contact point of the rear wheel 10r, and a vertical force Fzr1 urging the vehicle body B upward is generated by the force Fr1 at the ground contact point of the rear wheel 10r. Thus, the force in the direction of raising the vehicle body B acts as a result of the driving of the rear wheel 10r. In contrast, as illustrated in FIG. 2B, when a braking torque is applied to the rear wheel 10r, a force Fr2 backward in the travel direction of the vehicle acts at the ground contact point of the rear wheel 10r, and a vertical force Fzr2 urging the vehicle body B downward is generated by the force Fr2 at the ground contact point of the rear wheel 10r. Thus, the force in the direction of sinking the vehicle body B acts as a result of the braking of the rear wheel 10r. The suspension 20 converts the driving force and the braking force on the wheels 10 into the force in the vertical direction of the vehicle body B in this way.

A magnitude of the vertical force acting on the vehicle body B is a value acquired by multiplying the braking/driving force Ff1 (or Ff2) by tan(θf) on the front wheel 10f side, and is a value acquired by multiplying the braking/driving force Fr1 (or Fr2) by tan(θr) on the rear wheel 10r side. A vertical force conversion rate for converting the braking/driving force into the vertical force of the vehicle body B is represented as tan(θf) or tan(θr). The vertical force conversion rate is determined by the position of the instantaneous rotation center Cf or Cr, and the instantaneous rotation centers Cf and Cr are determined by the suspensions 20 (mainly the link mechanisms).

Thus, the force in the vertical direction can be applied to the vehicle body B by controlling the braking/driving force on the wheel 10, resulting in control of the motion state of the vehicle (vehicle body B).

Figure 3:
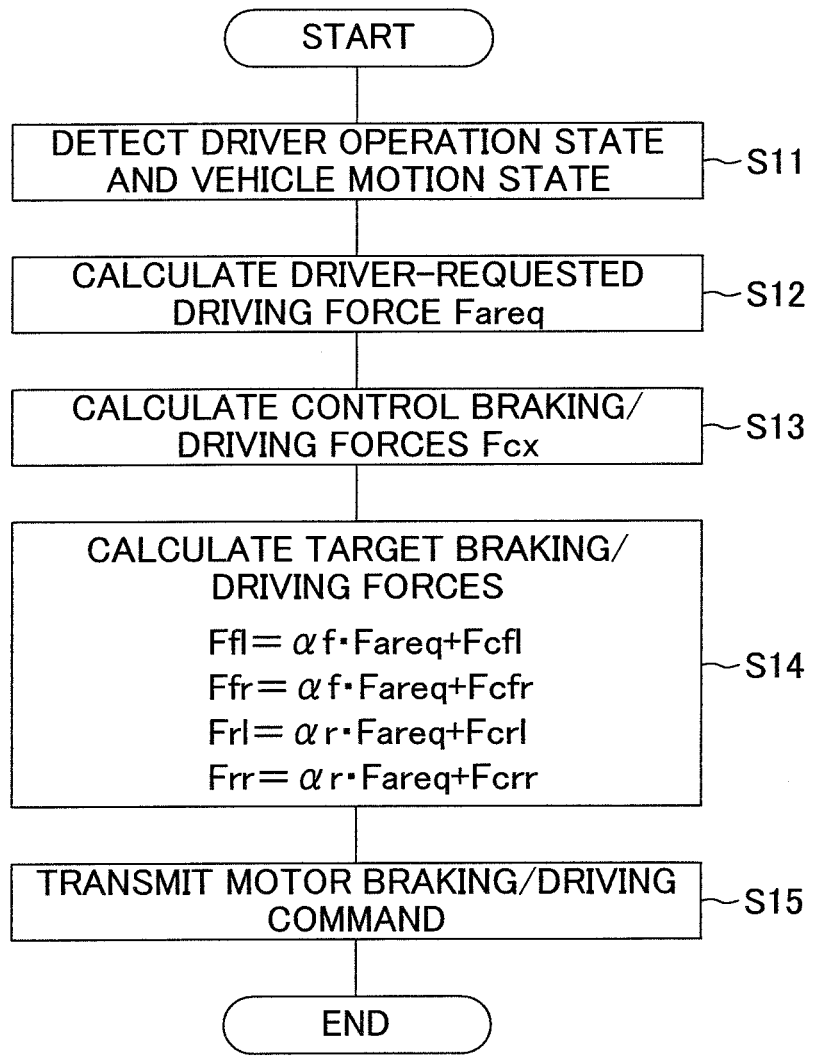
FIG. 3 is a flowchart for illustrating a drive control routine.

A description is now given of processing by the power ECU 51 during an accelerator operation. FIG. 3 is a flowchart for illustrating a drive control routine executed by the power ECU 51. The power ECU 51 repeats the drive control routine at a predetermined calculation cycle when the power ECU 51 in not receiving a regenerative braking request from the brake ECU 53.

When this routine starts, in Step S11, the power ECU 51 first detects a driver operation state and a vehicle motion state. In this case, the power ECU 51 acquires the accelerator operation amount and the steering operation amount obtained by the sensor values of the operation state detection device 60, and acquires the vehicle speed and motion state amounts representing degrees of motion states (the yaw motion, the roll motion, the pitch motion, and the heave motion) of the vehicle body obtained by the sensor values detected by the motion state detection device 65.

Then, in Step S12, the power ECU 51 calculates the driver-requested driving force Fareq based on the accelerator operation amount. The driver-requested driving force Fareq is a driving force in a vehicle fore-and-aft direction requested by the driver to be generated on the entire vehicle, that is, a driving force for traveling (force having such a direction as to increase the rotation speed of the wheels 10). The power ECU 51 stores association data such as a map for deriving the driver-requested driving force Fareq from the accelerator operation amount, and uses the association data to calculate the driver-requested driving force Fareq. For example, the driver-requested driving force Fareq is set to such a value as to increase as an accelerator operation amount (such as an accelerator opening degree) increases.

Then, in Step S13, the power ECU 51 calculates a control braking/driving force Fcfl for the front left wheel 10*fl*, a control braking/driving force Fcfr for the front right wheel 10*fr*, a control braking/driving force Fcrl for the rear left wheel 10*rl*, and a control braking/driving force Fcrr for the rear right wheel 10*rr*, which are control amounts required for the vehicle motion control. When the control braking/driving forces Fcfl, Fcfr, Fcrl, and Fcrr for the four wheels do not need to be distinguished from one another in terms of the corresponding respective wheels 10, those control braking/driving forces are hereinafter generally referred to as control braking/driving force Fcx.

The vehicle motion control is carried out, for example, when the difference between an ideal yaw rate and an actual yaw rate detected by the yaw rate sensor is more than a permissible value, or when at least one of a roll state amount, a pitch state amount, and a heave state amount is more than a permissible value. Thus, when the vehicle motion control does not need to be carried out, the control braking/driving force Fcx is set to zero.

For example, the control braking/driving force Fcx for each wheel 10 is calculated by using a target roll moment Mx for suppressing a roll motion of the vehicle body about a fore-and-aft axis (roll axis) passing through a center of gravity Cg of the vehicle, a target pitch moment My for suppressing a pitch motion of the vehicle body about a lateral axis (pitch axis) passing through the center of gravity Cg of the vehicle, a target yaw moment Mz for turning the vehicle body about a vertical axis (yaw axis) passing through the center of gravity Cg of the vehicle, and a target heave force Fz for suppressing a heave motion (bouncing) which is a vertical motion at the position of the center of gravity Cg of the vehicle. Various publicly known calculation methods may be employed to calculate those target values.

For example, the power ECU 51 uses the sensor values detected by the stroke sensors and the sprung vertical acceleration sensors to detect the positions, the speeds, and the accelerations in the vertical direction at the four wheels, thereby detecting the roll state amount, the pitch state amount, and the heave state amount, and calculates the target roll moment Mx, the target pitch moment My, and the target heave force Fz which have predetermined relationships with those detected state amounts in order to cancel those motions. Moreover, the power ECU 51 calculates, based on the difference between the ideal yaw rate set based on the steering angle and the vehicle speed and the actual yaw rate detected by the yaw rate sensor, the target yaw moment Mz set so as to eliminate the difference.

The power ECU 51 calculates the control braking/driving forces Fcfl, Fcfr, Fcrl, and Fcrr, for example, by using the following equation.

$$\begin{bmatrix} Fc_{fl} \\ Fc_{fr} \\ Fc_{rl} \\ Fc_{rr} \end{bmatrix} = \begin{bmatrix} -\frac{t_f}{2}\cdot\tan\theta_f & \frac{t_f}{2}\cdot\tan\theta_f & \frac{t_r}{2}\cdot\tan\theta_r & -\frac{t_r}{2}\cdot\tan\theta_r \\ L_f\cdot\tan\theta_f & L_f\cdot\tan\theta_f & L_r\cdot\tan\theta_r & L_r\cdot\tan\theta_r \\ -\frac{t_f}{2} & \frac{t_f}{2} & -\frac{t_r}{2} & \frac{t_r}{2} \\ -\tan\theta_f & -\tan\theta_f & \tan\theta_r & \tan\theta_r \end{bmatrix}^{-1} \cdot \begin{bmatrix} M_x \\ M_y \\ M_z \\ F_z \end{bmatrix}$$

In this equation, symbol tf represents a tread width between the front left and right wheels 10*f*, and symbol tr represents a tread width between the rear left and right wheels 10*r*. Symbol Lf represents a fore-and-aft horizontal distance between the center of gravity Cg of the vehicle and a center of the front left or right wheel 10*f*, and symbol Lr represents a fore-and-aft horizontal distance between the center of gravity Cg of the vehicle and a center of the rear left or right wheel 10*r*.

In this case, the motor ECU 52 selects three out of the target roll moment Mx, the target pitch moment My, the target yaw moment Mz, and the target heave force Fz to calculate the control braking/driving forces Fcfl, Fcfr, Fcrl, and Fcrr. This is because the braking/driving forces to be finally generated on the respective wheels 10 are determined by the driver-requested driving force Fareq, that is, such a restraint that a sum of the control braking/driving forces Fcfl, Fcfr, Fcrl, and Fcrr is set to zero exists, and hence the four target values cannot be used at the same time for the calculation. In this case, when the yaw motion control is necessary, the power ECU 51 preferentially selects the target yaw moment Mz and the target roll moment Mx, and uses those two target values Mz and Mx and any one of the remaining target values including the target pitch moment My and the target heave force Fz to calculate the control braking/driving forces Fcfl, Fcfr, Fcrl, and Fcrr.

Then, in Step S14, the power ECU 51 calculates a target braking/driving force Ffl for the front left wheel 10*fl*, a target braking/driving force Ffr for the front right wheel 10*fr*, a target braking/driving force Frl for the rear left wheel 10*rl*, and a target braking/driving force Frr for the rear right wheel 10*rr* by the following equations.

$Ffl = \alpha f \cdot Fareq + Fcfl$ $Ffr = \alpha f \cdot Fareq + Fcfr$ $Frl = \alpha r \cdot Fareq + Fcrl$ $Frr = \alpha r \cdot Fareq + Fcrr$ In the equations, symbol $\alpha f$ represents a distribution ratio of the driver-requested driving force Fareq distributed to one of the front wheels 10*f*, and symbol $\alpha r$ represents a distribution ratio of the driver-requested driving force Fareq distributed to one of the rear wheels 10*r* ($2\alpha f + 2\alpha r = 1$). The front/rear wheel distribution ratios $\alpha f$ and $\alpha r$ may be set to the same values (=1/4) both for the front and rear wheels 10*f* and 10*r*, or different values between the front wheels 10*f* and the rear wheels 10*r*. When the target braking/driving forces Ffl, Ffr, Frl, and Frr for the four wheels do not need to be distinguished from one another in terms of the corresponding respective wheels 10, those target braking/driving forces are hereinafter generally referred to as target braking/driving forces Fx.

Then, in Step S15, the power ECU 51 converts the target braking/driving force Fx for each wheel 10 into a target motor torque Tx for driving the motor 30, and transmits a braking/driving command signal representing the target motor torques Tx to the motor ECU 52. As a result, the motor ECU 52 follows the target motor torque Tx, to thereby output a control signal (such as a PWM control signal) generated so that the motor 30 generates the target torque to the motor driver 35. In this way, a duty ratio of switching devices of the motor driver 35 is controlled, and a current corresponding to the target torque is caused to flow through the motor 30, to thereby generate the braking/driving force on the wheel 10.

When the target motor torque Tx represents a driving torque, power running control is applied to the motor 30, and a current flows from the motor driver 35 to the motor 30. When the target motor torque Tx represents a braking torque, regenerative control is applied to the motor 30, and a current flows from the motor 30 to the battery 70 via the motor driver 35. In this way, the braking/driving force corresponding to the target braking/driving force Fx is generated on each wheel 10. A sum of the braking/driving forces of the respective wheels 10 is a value corresponding to the driver-requested driving force Fareq.

The power ECU 51 outputs the braking/driving command signal to the motor ECU 52, and then once finishes the drive control routine. Then, power ECU 51 repeats the drive control routine at the predetermined short cycle.

Figure 4:
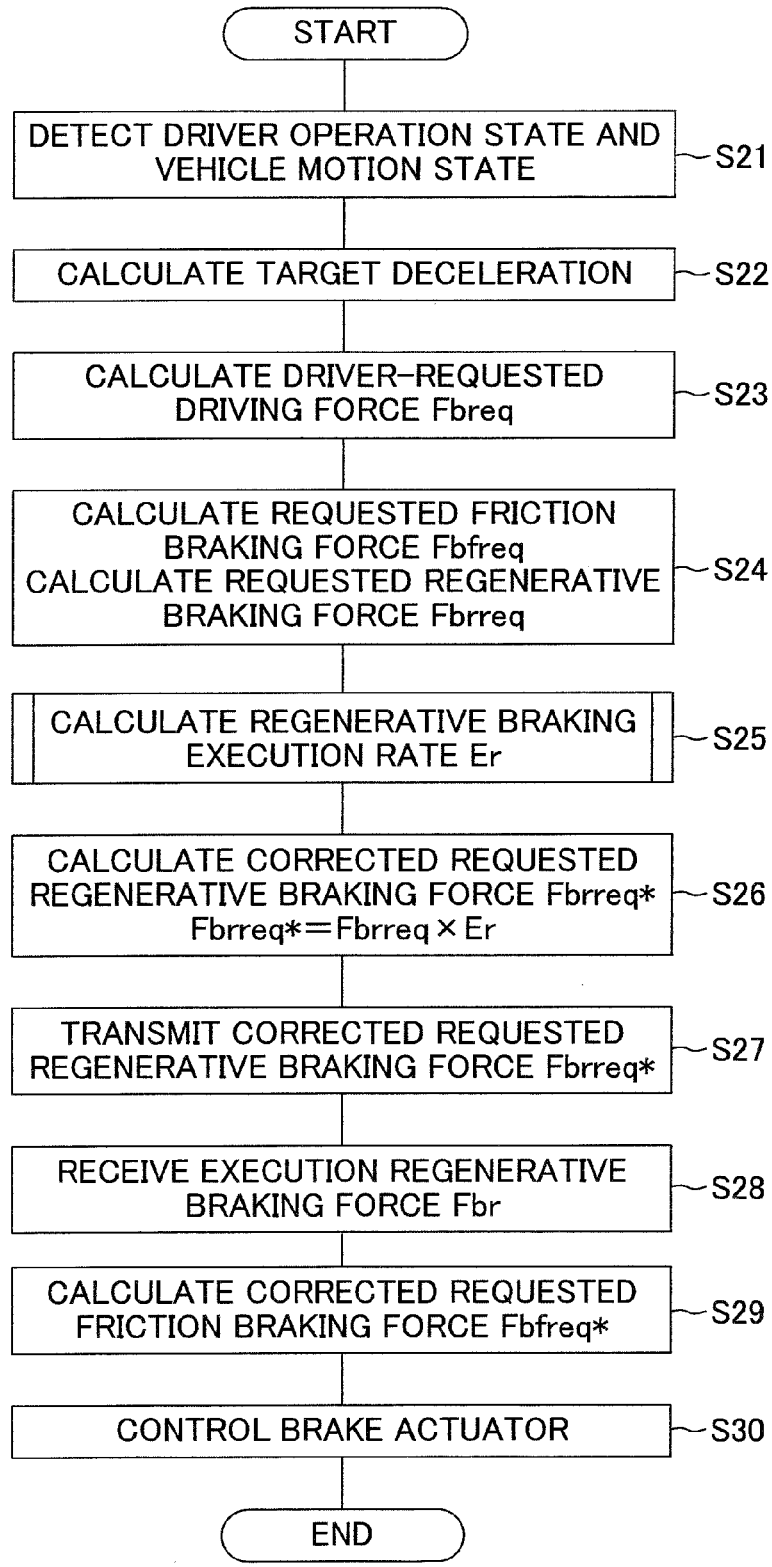
FIG. 4 is a flowchart for illustrating a main brake control routine.
Figure 5:
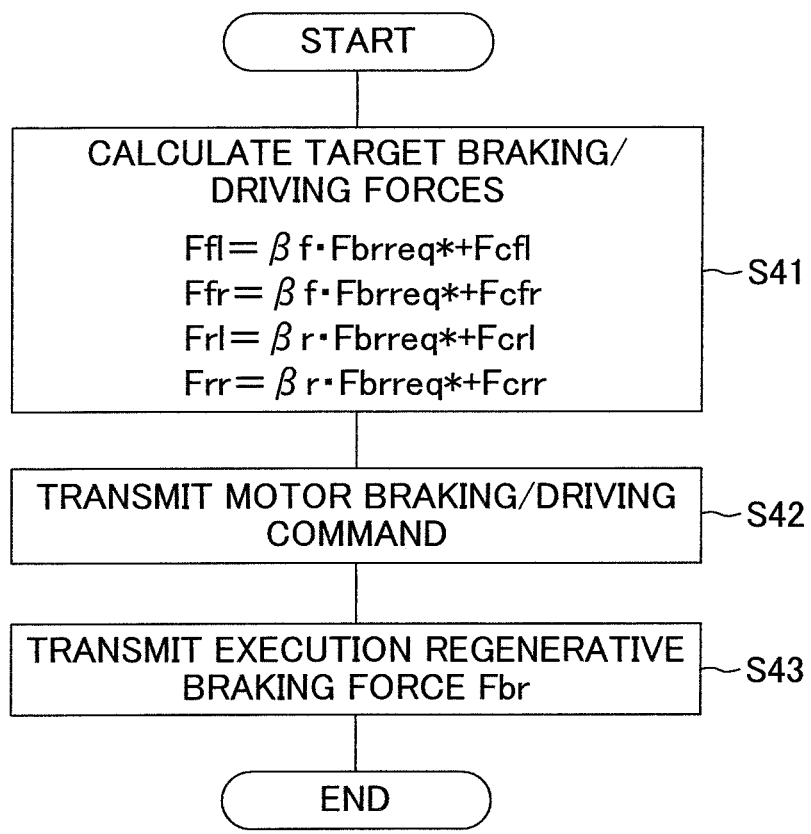
FIG. 5 is a flowchart for illustrating a regenerative brake control routine.

A description is now given of processing during a brake operation. FIG. 4 is a flowchart for illustrating a main brake control routine executed by the brake ECU 53. FIG. 5 is a flowchart for illustrating a regenerative brake control routine executed by the power ECU 51. The brake ECU 53 repeats the main brake control routine at a predetermined calculation cycle during the brake pedal operation. Moreover, the power ECU 51 repeats the regenerative brake control routine at a predetermined calculation cycle while the regenerative braking request is being received from the brake ECU 53.

When the main brake control routine starts, in Step S21, the brake ECU 53 detects the driver operation state and the vehicle motion state. In this case, the brake ECU 53 acquires the brake operation amount obtained by a sensor value of the operation state detection device 60, and the vehicle speed and the wheel speeds obtained by the sensor values of the motion state detection device 65.

Then, in Step S22, the brake ECU 53 calculates a target deceleration of the vehicle based on the brake operation amount. The brake ECU 53 stores association data for deriving the target deceleration from the brake operation amount, and calculates the target deceleration based on this association data. Then, in Step S23, the brake ECU 53 calculates a driver-requested braking force Fbreq on the wheels required in order to decelerate the vehicle at the target deceleration. The driver-requested braking force Fbreq corresponds to a total requested braking force according to the present invention.

Figure 6:
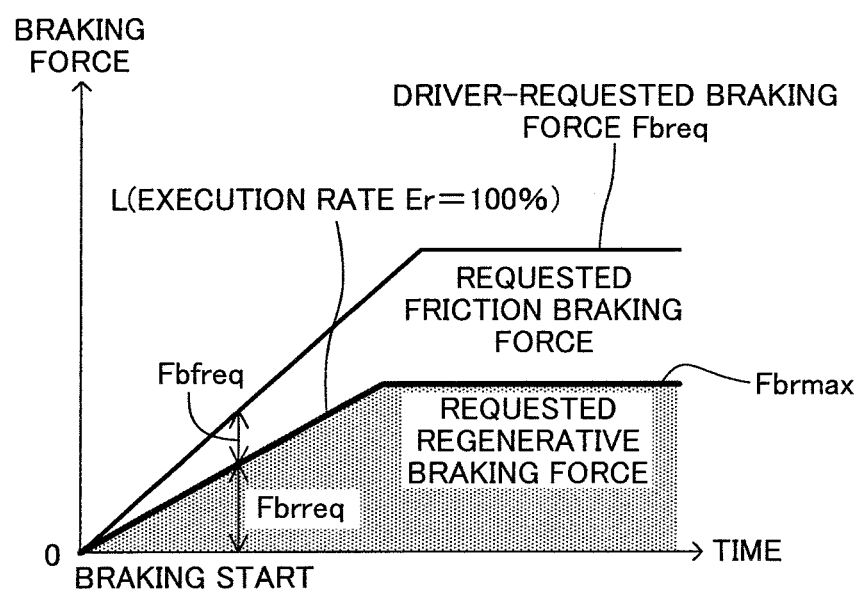
FIG. 6 is a graph for showing a distribution between a requested regenerative braking force and a requested friction braking force.

Then, in Step S24, the brake ECU 53 distributes the driver-requested braking force Fbreq to a requested friction braking force Fbfreq and a requested regenerative braking force Fbrreq. The brake ECU 53 stores data on a distribution characteristic of distributing the driver-requested braking force Fbreq to the requested friction braking force Fbfreq and the requested regenerative braking force Fbrreq, and follows the distribution characteristic to distribute the driver-requested braking force Fbreq to the requested friction braking force Fbfreq and the requested regenerative braking force Fbrreq. For example, as shown in FIG. 6, the distribution characteristic is set to such a characteristic that the driver-requested braking force Fbreq is distributed at a constant distribution ratio to the requested friction braking force Fbfreq and the requested regenerative braking force Fbrreq. The distribution characteristic is not limited to the constant distribution ratio, and can be set to an arbitrary distribution characteristic such as a distribution characteristic in which the distribution between the requested friction braking force Fbfreq and the requested regenerative braking force Fbrreq is determined based on the magnitude of the driver-requested braking force Fbreq.

An upper limit value Fbrmax is set to the requested regenerative braking force Fbrreq, and the requested regenerative braking force Fbrreq is thus set in a range equal to or less than the upper limit value Fbrmax. Thus, when the requested regenerative braking force Fbrreq is limited at the upper limit value Fbrmax, a remainder obtained by subtracting the requested regenerative braking force Fbrreq from the driver-requested braking force Fbreq is assigned to the requested friction braking force Fbfreq. Note that, the regenerative torque that can be generated by the motor 30 changes depending on the rotational speed of the motor 30. Therefore, the distribution characteristic is set to the characteristic based on the vehicle speed.

Then, in Step S25, the brake ECU 53 calculates a regenerative braking execution rate Er. The regenerative braking execution rate Er is calculated by a regenerative braking execution rate calculation routine described later.

According to the embodiment, as described later, when a state in which necessity for the vehicle motion control is high is brought about, it is estimated that a specific state in which a control braking/driving force that can be generated by the motor 30 is liable to be insufficient for the control braking/driving force Fcx required for the vehicle motion control has occurred. Thus, the absence/presence of the occurrence of the specific state is determined based on whether or not the state in which the necessity for the vehicle motion control is high is brought about.

When the necessity for the vehicle motion control is high, the brake ECU 53 decreases the distribution ratio of the requested regenerative braking force Fbrreq based on the distribution characteristic shown in FIG. 6. The distribution characteristic of the requested regenerative braking force Fbrreq shown in FIG. 6 is hereinafter referred to as reference characteristic. The regenerative braking execution rate Er is a parameter representing a degree of a decrease in the distribution ratio of the requested regenerative braking force Fbrreq with respect to the reference characteristic. The regenerative braking execution rate Er is set to a parameter acting to decrease the distribution ratio of the requested regenerative braking force Fbrreq with respect to the reference characteristic as the value of the regenerative braking execution rate Er decreases while the requested regenerative braking force Fbrreq distributed based on the reference characteristic is 1 (=100%).

A distribution characteristic line L of FIG. 6 represents the reference characteristic. Thus, as the regenerative braking execution rate Er decreases, the distribution characteristic line L is changed so as to shift downward. It should be understood that the driver-requested braking force Fbreq is not changed, and thus when the distribution ratio of the requested regenerative braking force Fbrreq is decreased, the ratio of the requested friction braking force Fbfreq increases accordingly.

Then, in Step S26, the brake ECU 53 multiplies the requested regenerative braking force Fbrreq by the regenerative braking execution rate Er, to thereby acquire a corrected requested regenerative braking force Fbrreq* as shown by the following equation.

$$Fbrreq^* = Fbrreq \times Er$$

Then, in Step S27, the brake ECU 53 transmits the corrected requested regenerative braking force Fbrreq* to the power ECU 51. When the power ECU 51 receives the corrected requested regenerative braking force Fbrreq*, the power ECU 51 executes the regenerative brake control routine illustrated in FIG. 5.

When the regenerative brake control routine starts, in Step S41, the power ECU 51 calculates the target braking/driving force Fx, which is the corrected requested regenerative braking force Fbrreq* distributed to each of the front/rear left/right wheels. The power ECU 51 uses the corrected requested regenerative braking force Fbrreq* and the control braking/driving force Fcx to calculate the target braking/driving force Ffl for the front left wheel 10fl, the target braking/driving force Ffr for the front right wheel 10fr, the target braking/driving force Frl for the rear left wheel 10rl, and the target braking/driving force Frr for the rear right wheel 10rr based on the following equations. In this case, in Step S41, the power ECU 51 calculates the control braking/driving forces Fcx as described above (S13).

$$Ffl = \beta f \cdot Fbrreq^* + Fcfl$$

$$Ffr = \beta f \cdot Fbrreq^* + Fcfr$$

$$Frl = \beta r \cdot Fbrreq^* + Fcrl$$

$$Frr = \beta r \cdot Fbrreq^* + Fcrr$$

In the equations, symbol $\beta f$ represents a distribution ratio of the corrected requested regenerative braking force Fbrreq* distributed to one of the front wheels 10f, and symbol $\beta r$ represents a distribution ratio of the corrected requested regenerative braking force Fbrreq* distributed to one of the rear wheels 10r ($2\beta f + 2\beta r = 1$). The front/rear wheel distribution ratios $\beta f$ and $\beta r$ are set in advance based on a ground contact weight ratio between the front and rear wheels or the like.

Note that, in Step S41, the power ECU 51 calculates the control braking/driving force Fcx, and, on this occasion, uses a value acquired by subtracting a value corresponding to the corrected requested regenerative braking force ($\beta f \cdot Fbrreq^*$ or $\beta r \cdot Fbrreq^*$) from the maximum value Fmax of the braking/driving force of the motor 30 determined by the vehicle speed and the like as an upper limit for the calculation of the control braking/driving force Fcx.

Then, in Step S42, the power ECU 51 converts the target braking/driving force Fx for each wheel 10 into the target motor torque Tx for driving the motor 30, and transmits the braking/driving command signal representing the target motor torque Tx to the motor ECU 52. As a result, the motor ECU 52 follows the target motor torque Tx to output the drive signal to the motor driver 35. When the target motor torque Tx represents a driving torque, the power running control is applied to the motor 30, and a current flows from the motor driver 35 to the motor 30. When the target motor torque Tx represents a braking torque, the regenerative control is applied to the motor 30, and a current flows from the motor 30 to the battery 70 via the motor driver 35. In this way, the braking/driving force corresponding to the target braking/driving force Fx is generated on each wheel 10. A sum of the braking/driving forces of the respective wheels 10 is a value corresponding to the corrected requested regenerative braking force Fbrreq*.

Then, in Step S43, the power ECU 51 transmits an execution regenerative braking force Fbr (a sum of the braking/driving forces actually generated on the four wheels) to the brake ECU 53, and once finishes the regenerative brake control routine. The power ECU 51 repeats the regenerative brake control routine while receiving the regenerative braking request from the brake ECU 53.

Referring again to FIG. 4, in Step S28, the brake ECU 53 receives the execution regenerative braking force Fbr transmitted from the power ECU 51, and, in Step S29, calculates a corrected requested friction braking force Fbfreq* (=Fbfreq+$\Delta$Fbr) acquired by using a difference $\Delta$Fbr (=Fbrreq−Fbr) between the requested regenerative braking force Fbrreq and the execution regenerative braking force Fbr to correct the requested friction braking force Fbfreq.

Then, in Step S30, the brake ECU 53 controls the operation of the brake actuator 45 based on the corrected requested friction braking force Fbfreq*. The brake ECU 53 stores association data for setting a relationship between a control hydraulic pressure in the hydraulic circuit and the friction braking force, and uses the association data to set the target control hydraulic pressure required in order to generate the corrected requested friction braking force Fbfreq*. The brake ECU 53 controls current supply to the linear control valve so that the hydraulic pressure detected by the hydraulic pressure sensor follows the target control hydraulic pressure. As a result, the friction brake mechanism 40 operates to brake each wheel 10 through the friction force.

Note that, in Step S24, before the distribution of the driver-requested braking force Fbreq to the requested friction braking force Fbfreq and the requested regenerative braking force Fbrreq, the brake ECU 53 determines the front/rear wheel distribution ratio of the driver-requested braking force Fbreq. Thus, the front/rear wheel distribution ratio of the corrected requested friction braking force Fbfreq* is determined so that a sum of the execution regenerative braking force Fbr and the corrected requested friction braking force Fbfreq* is distributed to the front wheels 10f and the rear wheels 10r at the front/rear wheel distribution ratio. The brake ECU 53 distributes the corrected requested friction braking force Fbfreq* based on the front/rear distribution ratio, and controls the operation of the brake actuator 45 so that the respective wheels 10 generate the distributed friction braking forces.

After the execution of the processing in Step S30, the brake ECU 53 once finishes the main brake control routine, and repeats the main brake control routine at the predetermined calculation cycle.

As a result, the wheel 10 is braked by the regenerative braking force generated by the electric power recovery by the motor 30, and the friction braking force generated by the friction resistance by the friction brake mechanism 40.

A description is now given of the regenerative braking execution rate Er. The regenerative braking execution rate Er is used as a parameter for adjusting a degree of decreasing the distribution ratio of the requested regenerative braking force Fbrreq to the driver-requested braking force Fbreq (also considered as a degree of increasing the requested friction braking force Fbfreq). In the following, a description is given of necessity for decreasing the distribution ratio of the requested regenerative braking force Fbrreq.

When the wheel 10 is braked, in terms of the energy efficiency, it is desired that a kinetic energy of the wheel 10 be converted into an electric energy as much as possible, thereby recovering the electric energy to the battery 70. In this case, the requested generative braking force Fbrreq only needs to be set in a range in which the requested generative braking force Fbrreq can be recovered to the battery 70, and the requested friction braking force Fbfreq only needs to be set so as to compensate an amount insufficient for the driver-requested braking force Fbreq when only the requested regenerative braking force Fbrreq is used.

However, as the requested regenerative braking force Fbrreq increases, the control braking/driving forces Fcx, which can be used for the vehicle motion control, decrease. For example, when a driver operates the brake pedal to cause the braking force to act on the wheels 10, and undesirable roll motion, pitch motion, heave motion, and the like are detected on the vehicle body B, the power ECU 51 uses the control braking/driving forces Fcx to generate vertical forces on the vehicle body B so as to cancel the motions. In this case, the magnitudes of the vertical forces to be generated on the vehicle body are determined by the magnitudes of the control braking/driving forces Fcx. Thus, as the requested regenerative braking force Fbrreq increases, the control braking/driving force Fcx available for the vehicle motion control decreases, and a margin of the vertical force that can be generated by the braking/driving force of the motor 30 thus decreases. Therefore, there is a fear that satisfactory vehicle motion control cannot be carried out.

Moreover, the power ECU 51 uses the control braking/driving forces Fcx to generate braking/driving forces so as to correct the yaw motion, and so as not to generate the roll motion as a result of the correction. Also in this case, as the requested regenerative braking force Fbrreq increases, the control braking/driving forces Fcx available for the vehicle motion control decrease, and there is a fear that satisfactory vehicle motion control cannot be carried out.

Figure 7A:
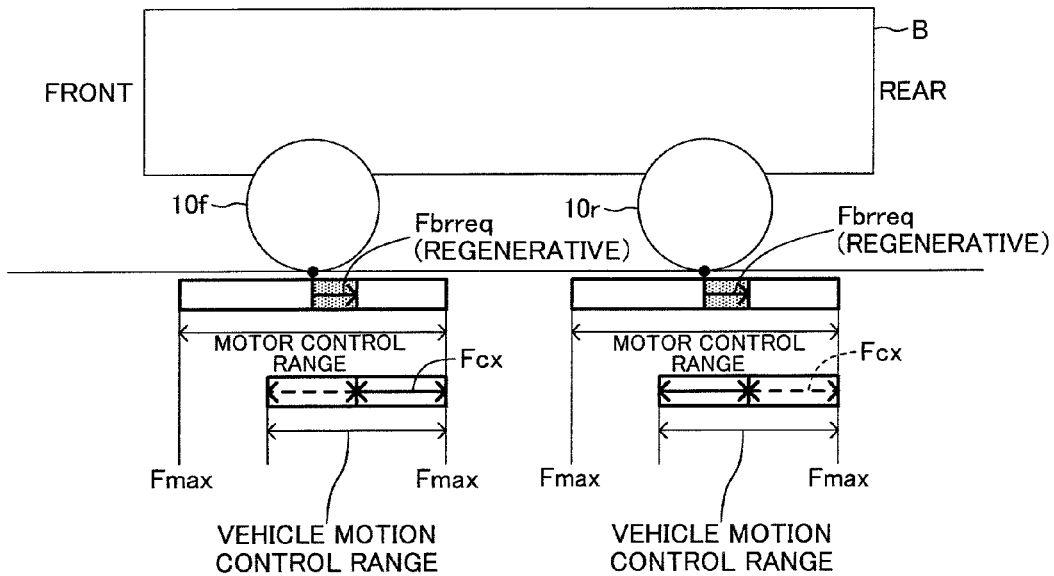
FIGS. 7A and 7B are schematic diagrams for illustrating vehicle motion control ranges.
Figure 7B:
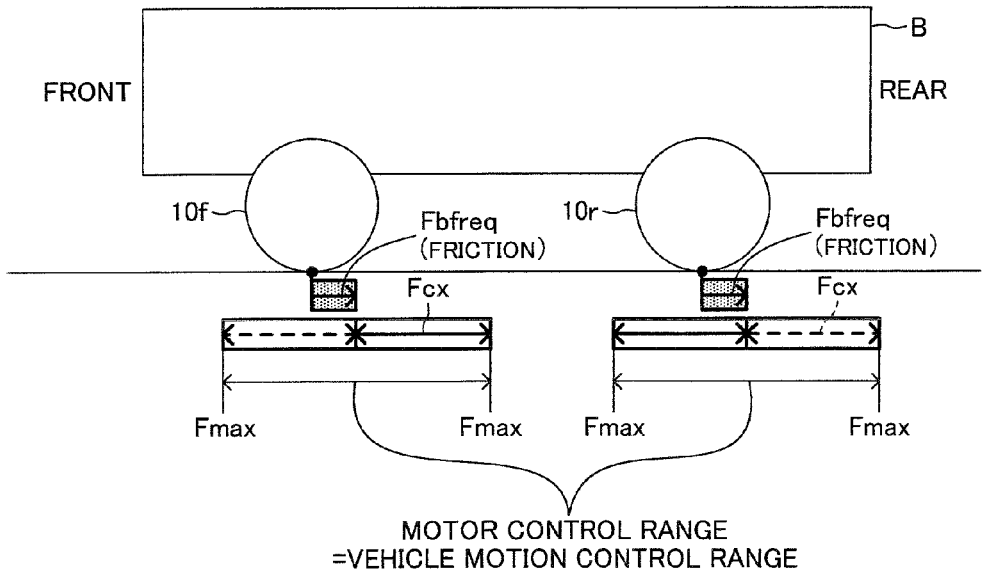

FIGS. 7A and 7B are illustrations of a change in the range of the control braking/driving forces Fcx that can be generated by the motors 30. FIG. 7A is an illustration of the ranges of the control braking/driving forces Fcx when 100% of the driver-requested braking force Fbreq is assigned to the requested regenerative braking force Fbrreq, and FIG. 7B is an illustration of the ranges of the control braking/driving forces Fcx when 100% of the driver-requested braking force Fbreq is assigned to the requested friction braking force Fbfreq. On this occasion, the driver-requested braking force Fbreq, the requested regenerative braking force Fbrreq, and the requested friction braking/driving force Fbfreq represent those for the one wheel while the front/rear distribution ratio of the driver-requested braking force Fbreq is 1:1.

As illustrated in FIG. 7A, when 100% of the driver-requested braking force Fbreq is covered by the regeneration, the target braking/driving force Fx acquired by adding the control braking/driving force Fcx is set based on the state in which the requested regenerative braking force Fbrreq is generated. Therefore, when the vehicle motion control is carried out, the motor 30 can generate the control braking/driving force Fcx only in a range of performance acquired by excluding the requested generative braking force Fbrreq from the maximum braking/driving force Fmax of the motor 30. On this occasion, the maximum braking/driving force Fmax represents the maximum braking force that can be generated by the regenerative torque of the motor 30 and a driving force equivalent in the magnitude (absolute value) to this maximum braking force.

On the other hand, as illustrated in FIG. 7B, when 100% of the driver-requested braking force Fbreq is covered by the friction force, the requested regenerative braking force Fbrreq is set to zero, and only the control braking/driving force Fcx needs to be generated by the motor 30. Therefore, for the vehicle motion control, the motor 30 can generate the control braking/driving force Fcx in a range in which the maximum braking/driving force Fmax of the motor 30 can be fully used.

Thus, according to this embodiment, when the necessity for the vehicle motion control is high, the distribution ratio of the requested regenerative braking force Fbrreq is decreased, and the distribution ratio of the requested friction braking force Fbfreq is increased (from FIG. 7A to FIG. 7B). In other words, the state in which the necessity for the vehicle motion control is high is considered as a state in which there is a fear that the control braking/driving force that can be generated by the motor 30 is insufficient, and the distribution ratio of the requested regenerative braking force Fbrreq is thus decreased. As a result, the range of the control braking/driving force Fcx that can be generated by the motor 30 can be extended.

A description is now given of processing of setting the distribution ratio of the requested regenerative braking force Fbrreq. The distribution ratio of the requested regenerative braking force Fbrreq is calculated by the regenerative braking execution rate calculation routine (FIG. 8) illustrated in FIG. 8. This regenerative braking execution rate calculation routine is a subroutine built into Step S25 of the main brake control routine (FIG. 4) to be executed.

Figure 9:
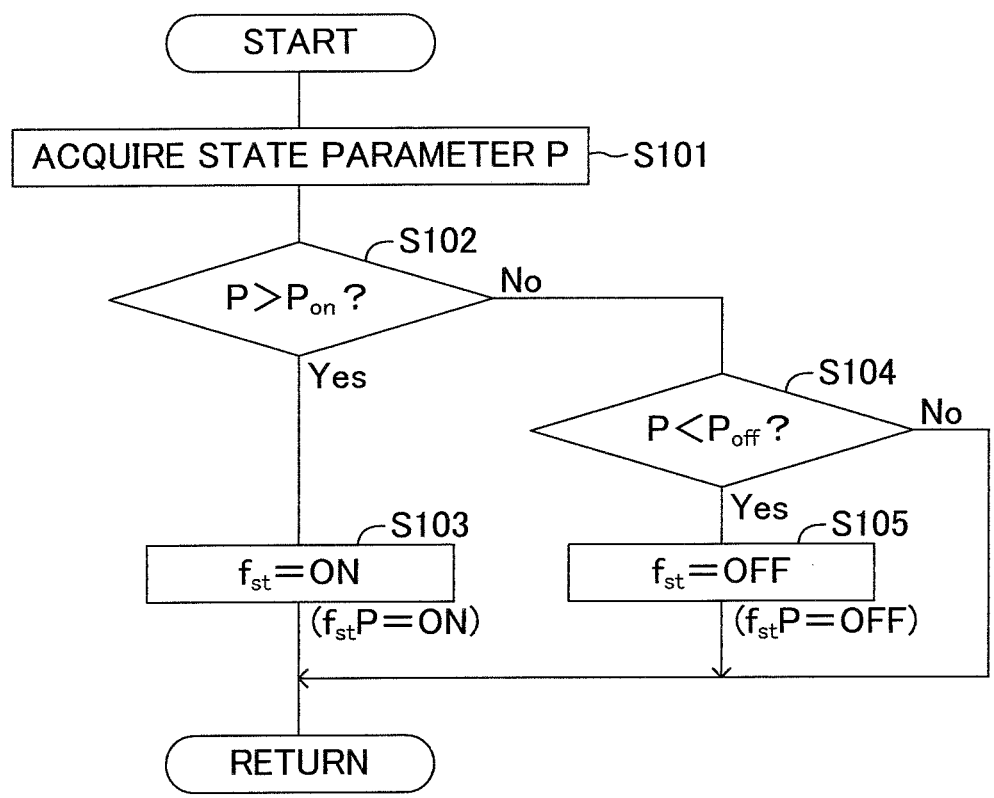
FIG. 9 is a flowchart for illustrating a vehicle motion state determination flag setting routine.

When the regenerative braking execution rate calculation routine is started, in Step S100, the brake ECU 53 executes vehicle motion state determination flag setting processing to read a state flag fst set by this vehicle motion state determination flag setting processing. This vehicle motion state determination flag setting processing is executed in accordance with a vehicle motion state determination flag setting routine illustrated in FIG. 9.

When the vehicle motion state determination flag setting routine is started, in Step S101, the brake ECU 53 acquires a value of a state parameter (referred to as state parameter P) for determining the vehicle motion state. As the state parameter P, at least one of a steering angle, a steering angular velocity acquired by differentiating the steering angle with respect to time, a yaw rate of the vehicle body, a sprung vertical acceleration, which is a vertical acceleration of sprung parts of the respective wheels 10, and an unsprung vertical acceleration, which is a vertical acceleration of unsprung parts of the respective wheels 10, can be employed. The brake ECU 53 acquires the state parameter P detected by at least one of the operation state detection device 60 and the motion state detection device 65.

Then, in Step S102, the brake ECU 53 determines whether or not the state parameter P is more than an ON threshold Pon. The ON threshold Pon is a threshold used to determine whether or not the vehicle motion state is a state in which the necessity for the vehicle motion control is high, and when the state parameter P is more than the ON threshold Pon, the vehicle motion state is determined to be the state in which the necessity for the vehicle motion control is high. Thus, the state parameter P is an index representing the necessity for the vehicle motion control, and the ON threshold Pon is a determination threshold for determining whether or not the vehicle motion state is the state in which the necessity for the vehicle motion control is high. For example, when the steering angle is more than a set steering angle, when the steering angular velocity is more than a set steering angular velocity, when the lateral acceleration of the vehicle body is more than a set lateral acceleration, when the yaw rate of the vehicle body is more than a set yaw rate, when the sprung vertical acceleration is more than a set sprung vertical acceleration, or when the unsprung vertical acceleration is more than a set unsprung vertical acceleration, the vehicle motion state can be determined to be the state in which the necessity for the vehicle motion control is high.

When the state parameter P is more than the ON threshold Pon (Yes in Step S102), in Step S103, the brake ECU 53 sets the state flag fst to ON (fst=ON). Note that, when a plurality of types of state parameters P (such as the steering angle, the steering angular velocity, and the sprung vertical acceleration) are set, the thresholds (ON threshold Pon and an OFF threshold Poff described later) are set for respective state parameters, and when one or n (>1) of the plurality of state parameters P pass the thresholds, the state flag fst only needs to be switched in Step S103.

On the other hand, when the state parameter P is equal to or less than the ON threshold Pon (No in Step S102), in Step S104, the brake ECU 53 determines whether or not the state parameter P is less than the OFF threshold Poff. The OFF threshold Poff is a threshold for resetting (terminating) the determination that the vehicle motion state is the state in which the necessity for the vehicle motion control is high. Thus, an area between the ON threshold Pon and the OFF threshold Poff is a dead zone (ON threshold Pon>OFF threshold Poff).

When the state parameter P is less than the OFF threshold Poff (Yes in Step S104), in Step S105, the brake ECU 53 sets the state flag fst to OFF (fst=OFF). When the state parameter P is equal to or more than the OFF threshold Poff (No in Step S104), the brake ECU 53 does not change the state flag fst.

Figure 8:
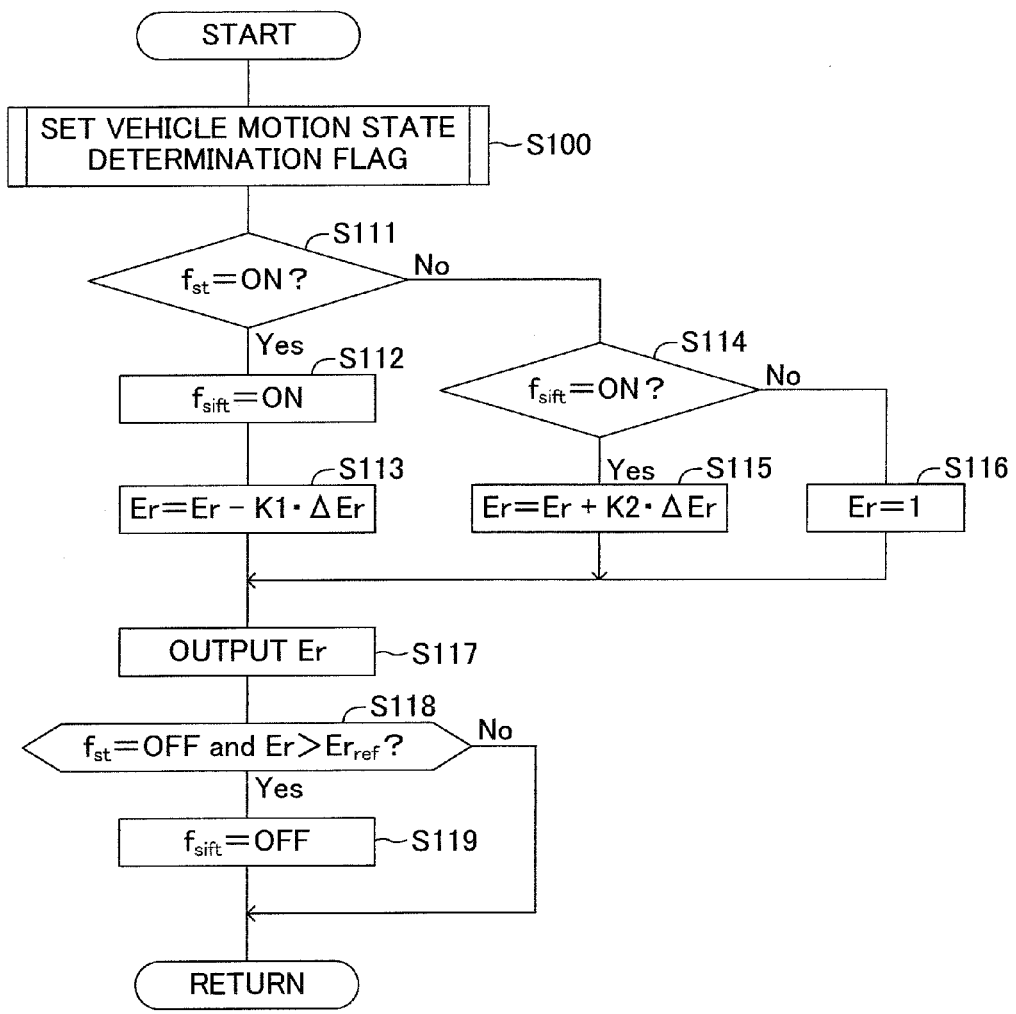
FIG. 8 is a flowchart for illustrating a regenerative braking execution rate calculation routine.

After the brake ECU 53 sets the state flag fst, the brake ECU 53 finishes the vehicle motion state determination flag setting routine, and advances its processing to Step S111 of the regenerative braking execution rate calculation routine (FIG. 8). In Step S111, the brake ECU 53 determines whether or not the state flag fst is set to ON.

When the state flag fst is set to ON (Yes in Step S111), in Step S112, the brake ECU 53 sets a shift state flag fsift representing such a state that the regenerative braking execution rate Er is decreasing from 1 (=100%) (state in which the distribution characteristic line L of FIG. 6 is shifting downward from the reference characteristic) to ON. Then, in Step S113, the brake ECU 53 decreases the regenerative braking execution rate Er by a predetermined amount (K1·ΔEr) (Er=Er−K1·ΔEr). This predetermined amount (K1·ΔEr) is calculated by multiplying an adjustment amount ΔEr (constant value) per unit time (per calculation cycle) set in advance by the decrease gain K1. Note that, the minimum value (for example zero) is set to the regenerative braking execution rate Er. Thus, in Step S113, when the regenerative braking execution rate Er has reached the minimum value, the brake ECU 53 does not further decrease the regenerative braking execution rate Er.

On the other hand, when the state flag fst is not set to ON (NO in Step S111), that is, when the state flag fst is set to OFF, in Step S114, the brake ECU 53 determines whether or not the shift state flag fsift is set to ON. When the shift state flag fsift is set to ON (Yes in Step S114), in Step S115, the brake ECU 53 increases the regenerative braking execution rate Er by a predetermined amount (K2·ΔEr) (Er=Er+ K2·ΔEr). This predetermined amount (K2·ΔEr) is calculated by multiplying the adjustment amount ΔEr (constant value) per unit time (per calculation cycle) set in advance by the increase gain K2.

Moreover, when, in Step S114, the determination is "No", that is, the shift state flag fsift is set to OFF, in Step S116, the brake ECU 53 sets the regenerative braking execution rate Er to 1 (=100%).

When the brake ECU 53 calculates the regenerative braking execution rate Er in any of the pieces of processing in Steps S113, 115, and S116, in the next Step S117, the brake ECU 53 outputs the regenerative braking execution rate Er. This regenerative braking execution rate Er is used to calculate the corrected requested regenerative braking force Fbrreq* in Step S26 of the above-mentioned main brake control routine.

Then, in Step S118, the brake ECU 53 determines whether or not the state flag fst is set to OFF, and the regenerative braking execution rate Er is more than a threshold Erref. In other words, it is determined whether or not the vehicle motion state is the state in which the necessity for the vehicle motion control is not high, and the regenerative braking execution rate Er is increasing close to 1 (<1). When a determination is "Yes", in Step S119, the brake ECU 53 sets the shift state flag fsift to OFF, finishes this routine, and advances the processing to Step S26 of the main brake control routine (FIG. 4). On the other hand, in Step S118, when the determination is "No", the processing in Step S119 is skipped.

The regenerative braking execution rate calculation routine (FIG. 8) is integrated into the main brake control routine, and is repeated at a predetermined calculation cycle. Thus, when the state parameter P for determining the vehicle motion state is more than the ON threshold, the regenerative braking execution rate Er is gradually decreased. Moreover, when the state parameter P for determining the vehicle motion state becomes less than the OFF threshold, the regenerative braking execution rate Er is gradually increased (recovered).

Note that, the decrease gain K1 or the increase gain K2 may be constant values, or may be variably set based on, for example, the vehicle motion state.

In the braking force control apparatus for a vehicle according to this embodiment described above, under the state in which the necessity for the vehicle motion control is high (fst=ON), the distribution to the requested regenerative braking force out of the driver-requested braking force is changed to decrease by decreasing the regenerative braking execution rate Er. Therefore, the motor margin that can be used for the vehicle motion control can be increased. In other words, the setting range (vehicle motion control range) of the control braking/driving force Fcx can be increased. As a result, the vehicle motion control can be satisfactorily carried out during the braking.

Moreover, when the state parameter P for determining the vehicle motion state becomes less than the OFF threshold Poff, the regenerative braking execution rate Er is gradually increased (recovered). Thus, under the state in which the necessity for the vehicle motion control is low, the ratio of the regenerative braking can be maintained high, and the kinetic energy of the wheels 10 can be thus converted into an electric energy, thereby recovering the electric energy to the battery 70. Thus, the energy efficiency becomes satisfactory.

Moreover, the regenerative braking execution rate Er is gradually decreased or increased. Thus, the switching between the regenerative braking and the friction braking can be satisfactorily carried out. Moreover, a decrease speed of the regenerative braking execution rate Er is set by the decrease gain K1. An increase speed of the regenerative braking execution rate Er is set by the increase gain K2. Thus, the change speeds can be appropriately set respectively in the decrease direction and the increase direction.

Moreover, the state parameter for determining the vehicle motion state is used to determine whether or not the state in which the necessity for the vehicle motion control is high (specific state in which the control braking/driving force that can be generated by the motor 30 is liable to be insufficient for the control braking/driving force required for the vehicle motion control) exists, and the determination is thus easy.

Moreover, for example, in a vehicle in which at least one of yaw motion control of controlling the motion in the yaw direction of the vehicle body and roll suppression control of suppressing the motion of the roll direction of the vehicle body is carried out, when at least one of the steering angle, the steering velocity, the lateral acceleration of the vehicle body, and the yaw rate of the vehicle body is set as the state parameter P, and the state flag fst is set to ON when the state parameter P is more than the determination threshold (ON threshold Pon), the above-mentioned vehicle motion control can be satisfactorily carried out.

Moreover, for example, in a vehicle in which at least one of sprung vertical vibration suppression control of suppressing the motion in the vertical direction of the vehicle body and pitch suppression control of suppressing the motion of the pitch direction of the vehicle body is carried out, when at least one of the sprung vertical acceleration and the unsprung vertical acceleration is set as the state parameter P, and the state flag fst is set to ON when the state parameter P is more than the determination threshold (ON threshold Pon), the above-mentioned vehicle motion control can be satisfactorily carried out.

The vehicle braking/driving force control apparatus according to this embodiment is described above, but the present invention is not limited to the above-mentioned embodiment. Various modifications may be made thereto without departing from the object of the present invention. A description is now given of modified examples.

Modified Example 1

Figure 10:
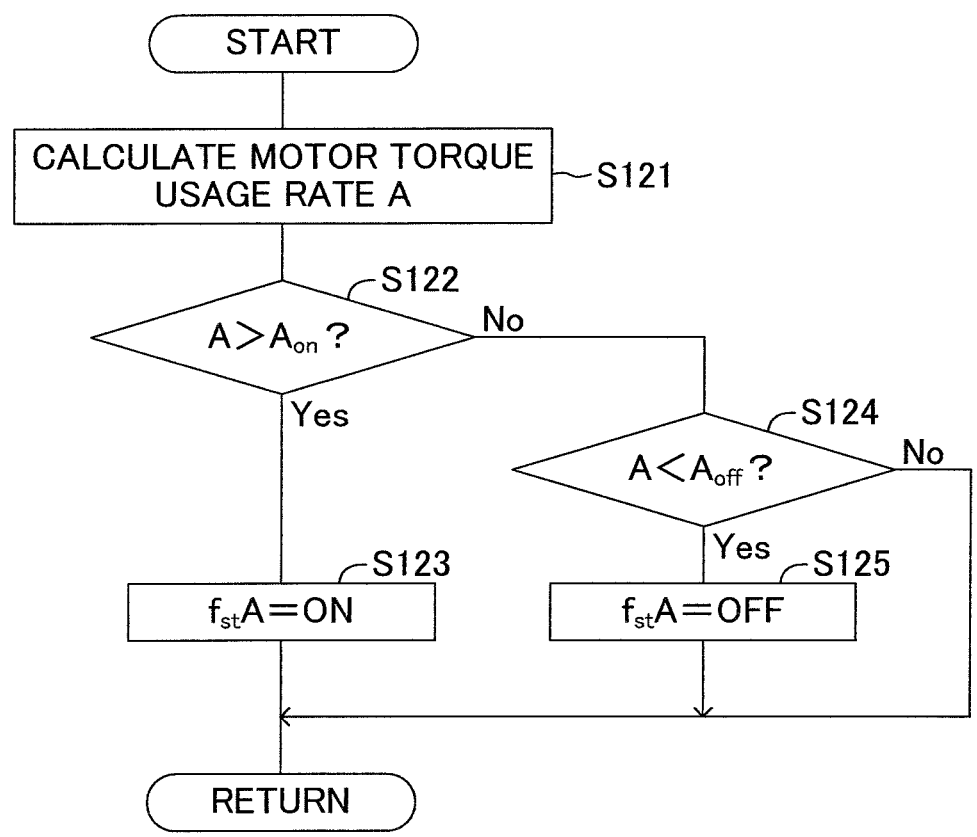
FIG. 10 is a flowchart for illustrating a motor torque usage rate flag setting routine (Modified Example 1).
Figure 11:
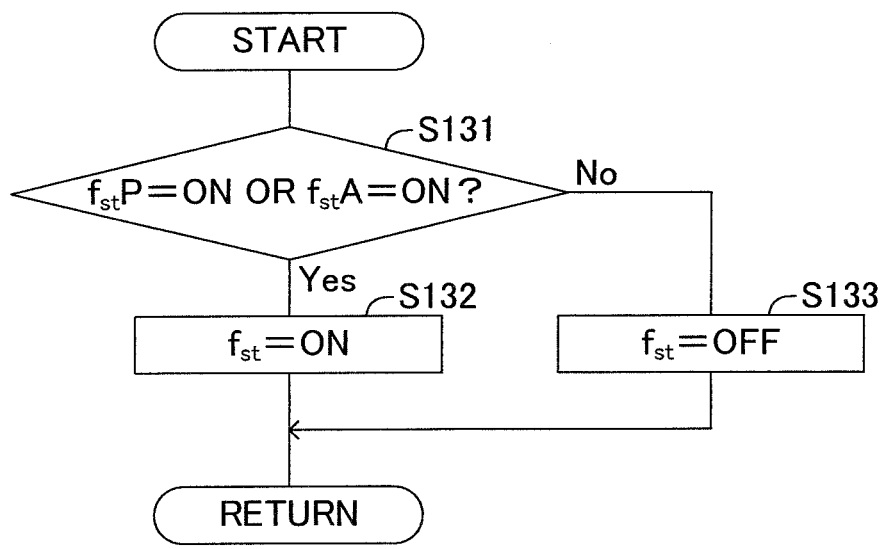
FIG. 11 is a flowchart for illustrating a state flag setting routine (Modified Example 1).

In the embodiment described above, the state flag fst is set based on the motion state or the operation state of the vehicle, but, in Modified Example 1, the state flag fst is set by further considering the usage rate of the motor torque. FIG. 10 and FIG. 11 are flowcharts for illustrating processing as Modified Example 1. FIG. 10 is a flowchart for illustrating a motor torque usage rate setting routine. FIG. 11 is a flowchart for illustrating a final state flag setting routine additionally reflecting a motor torque usage rate flag.

The brake ECU 53 starts the motor torque usage rate flag setting routine, and, in Step S121, calculates a motor torque usage rate A. In this case, the brake ECU 53 acquires, from the power ECU 51, data representing the target braking/driving torques of the four wheels and the braking torques that can be generated by the motors 30 currently calculated, and calculates the motor torque usage rate A based on the data. The target braking/driving torque may be a value acquired by converting the target braking/driving force Fx (corrected requested regenerative braking force Fbrreq*+ control braking/driving force Fcx) into a motor torque. The braking torque that can be generated by the motor 30 is set based on, for example, a vehicle speed (motor rotational speed). The motor usage rate A may be acquired by dividing the maximum braking/driving torque in the braking direction among the braking/driving torques in the braking direction of the four wheels by the braking torque that can be generated by the motor 30 for the one wheel. Alternatively, for example, the motor usage rate A may be acquired by dividing a sum of the target braking/driving torques of the four wheels by a sum of the braking torques that can be generated by the motors 30 of the four wheels. Moreover, in place of the target braking/driving torque, an achieved value (actual value) of the braking torque actually generated by the motor 30 may be used. This motor torque usage rate A corresponds to a margin degree according to the present invention.

Then, in Step S122, the brake ECU 53 determines whether or not the motor torque usage rate A is more than an ON threshold Aon set in advance. The ON threshold Aon is a threshold used to determine whether or not the margin of the motor 30 is small, and when the motor torque usage rate A is more than the ON threshold Aon, this state is determined to be a state in which the margin of the motor 30 is small.

When the motor torque usage rate A is more than the ON threshold Aon (Yes in Step S122), in Step S123, the brake ECU 53 sets the motor usage state flag fstA to ON (fstA=ON).

On the other hand, when the motor torque usage rate A is equal to or less than the ON threshold Aon (No in Step S122), in Step S124, the brake ECU 53 determines whether or not the motor torque usage rate A is less than the OFF threshold Aoff. The OFF threshold Aoff is a threshold for resetting (terminating) the determination that the state in which the margin of the motor 30 is small exists. Thus, an area between the ON threshold Aon and the OFF threshold Aoff is a dead zone (ON threshold Aon>OFF threshold Aoff).

When the motor torque usage rate A is less than the OFF threshold Aoff (Yes in Step S124), in Step S125, the brake ECU 53 sets the motor usage state flag fstA to OFF (fstA=OFF). When the motor torque usage rate A is equal to or more than the OFF threshold Aoff (No in Step S124), the brake ECU 53 does not change the motor usage state flag fstA.

If the brake ECU 53 sets the motor usage state flag fstA, the brake ECU 53 finishes the motor torque usage flag setting routine, and advances the processing to the state flag setting routine (FIG. 11).

In Modified Example 1, based on the motor usage state flag fstA and the state flag fst set based on the state parameter P described in the embodiment (FIG. 9), a final state flag fst is set. In the following, the state flag fst set based on the state parameter P will be referred to as vehicle motion state flag fstP when the state flag fst is distinguished from the final state flag fst. In Modified Example 1, the vehicle motion state flag fstP is set in accordance with the flowchart of FIG. 9, and the motor usage state flag fstA is set in accordance with the flowchart of FIG. 10.

The brake ECU 53 executes the state flag setting routine illustrated in FIG. 11 under the state in which the vehicle motion state flag fstP and the motor usage state flag fstA are set. In Step S131, the brake ECU 53 determines whether or not at least one of the vehicle motion state flag fstP and the motor usage state flag fstA is set to ON. When the brake ECU 53 makes a determination of "Yes", in Step S132, the brake ECU 53 sets the state flag fst to ON. On the other hand, when both of the vehicle motion state flag fstP and the motor usage state flag fstA are OFF, in Step S133, the brake ECU 53 sets the state flag fst to OFF.

After the brake ECU 53 sets the state flag fst, the brake ECU 53 finishes the state flag setting routine, and advances its processing to Step S111 of the regenerative braking execution rate calculation routine.

According to Modified Example 1 described above, when the motor torque usage rate A is high (the margin degree is low), the state flag fst is set to ON to decrease the regenerative braking execution rate Er. Thus, the regenerative braking execution rate Er is adjusted based not only on the vehicle motion state but also on the margin degree of the torque that can be generated by the motor 30, and hence the margin of the control braking force that is generated by the motor 30 can be further appropriately maintained. Thus, the vehicle motion control can be further satisfactorily carried out. Note that, the margin degree may be set by using a value of the torque (margin) that can be additionally generated by the motor 30 or the like in place of the motor torque usage rate A.

Modified Example 2

Under a state in which a grip force of the tire is approaching a limit during the braking, even when the driver-requested braking force is generated by the friction braking force to provide a margin for the vehicle motion control to the motor 30, satisfactory vehicle motion control cannot be carried out in the first place. Thus, in Modified Example 2, when this state is detected, by shifting the braking force that generates the driver-requested braking force from the friction braking force to the regenerative braking force, a kinetic energy, which was supposed to be lost by the friction braking, is converted into an electric energy, and is recovered to the battery 70.

Figure 12:
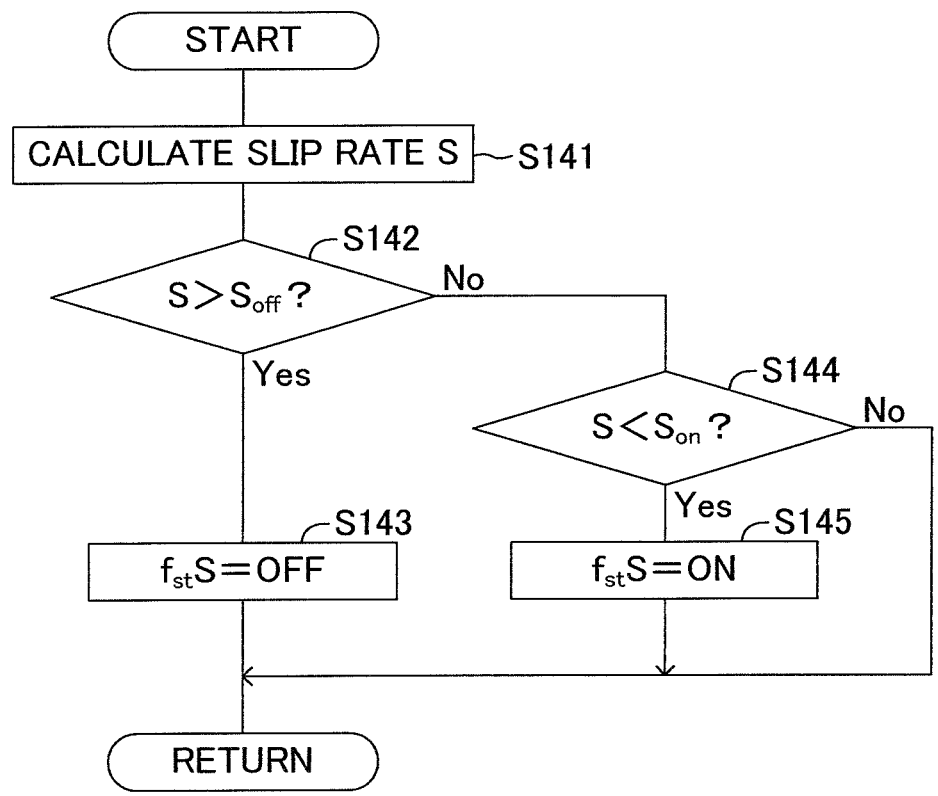
FIG. 12 is a flowchart for illustrating a slip rate flag setting routine (Modified Example 2).
Figure 13:
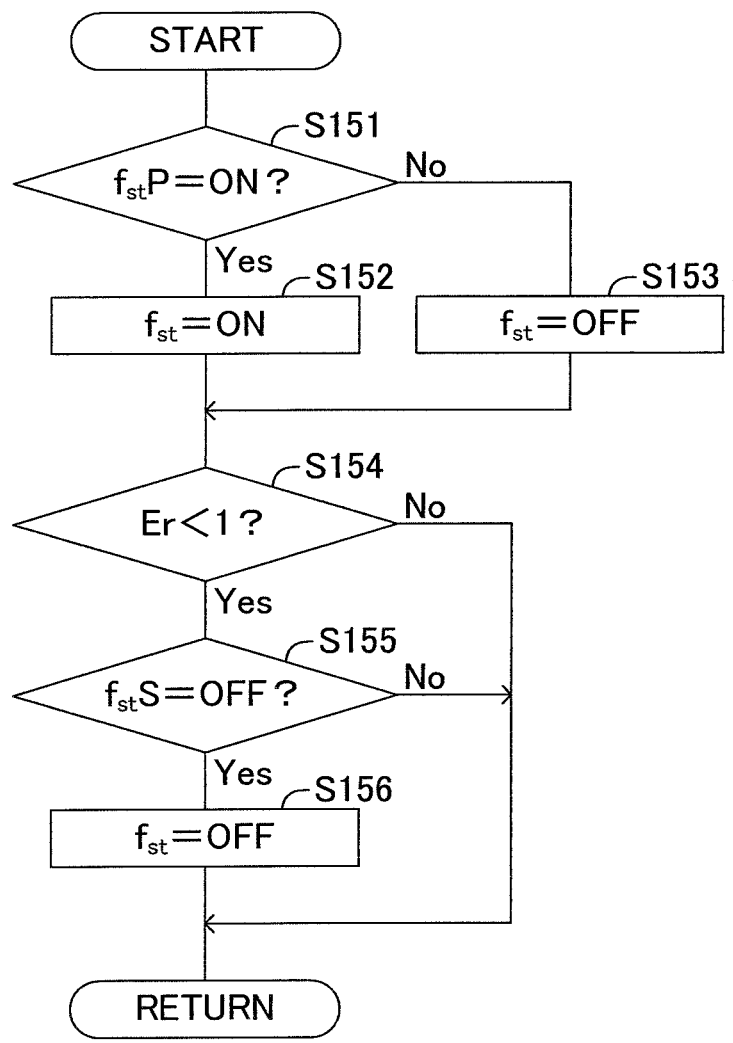
FIG. 13 is a flowchart for illustrating a state flag setting routine (Modified Example 2).

FIG. 12 and FIG. 13 are flowcharts for illustrating processing as Modified Example 2. FIG. 12 is a flowchart for illustrating a slip rate flag setting routine. FIG. 13 is a flowchart for illustrating a final state flag setting routine additionally reflecting a slip rate flag.

The brake ECU 53 starts the slip rate flag setting routine (FIG. 12), and then, in Step S141, calculates slip rates S of the four wheels. The slip rate S represents a degree of lock of the wheel 10 caused by the braking force applied to the wheel 10 during the vehicle travel, and can be calculated as ((vehicle speed−wheel speed)/vehicle speed×100%). The slip rate S is a parameter used to determine whether or not a grip force of the tire is close to a limit during the braking. In the following, the slip rate S is compared with an OFF threshold Soff and an ON threshold Son. As the slip rate S subject to the comparison, a value reflecting slip states of the four wheels such as the maximum slip rate among the slip rates of the four wheels or an average of the slip rates S of the four wheels may be appropriately employed.

Then, in Step S142, the brake ECU 53 determines whether or not the slip rate S is more than the OFF threshold Soff set in advance. The OFF threshold Soff is a threshold for determining whether or not a state in which the wheel 10 is locked, or a state in which the wheel 10 is about to be locked (those states are referred to as lock states) exists, and when the slip rate S is more than the OFF threshold Soff, the wheel 10 is determined to be in the lock state.

When the slip rate S is more than the OFF threshold Soff (Yes in Step S142), in Step S143, the brake ECU 53 sets the slip rate flag fstS to OFF (fstS=OFF).

On the other hand, when the slip rate S is equal to or less than the OFF threshold Soff, (No in Step S142), in Step S144, the brake ECU 53 determines whether or not the slip rate S is less than the ON threshold Son. The ON threshold Son is a threshold for resetting (terminating) the determination that the lock state exists. Thus, an area between the OFF threshold Soff and the ON threshold Son is a dead zone (ON threshold Son>OFF threshold Soff).

When the slip rate S is less than the ON threshold Son (Yes in Step S144), in Step S145, the brake ECU 53 sets the slip rate flag fstS to ON (fstS=ON). When the slip rate S is equal to or more than the ON threshold Son (No in Step S144), the brake ECU 53 does not change the slip rate flag fstS.

If the brake ECU 53 sets the slip rate flag fstS, the brake ECU 53 finishes the slip rate flag setting routine, and advances the processing to the state flag setting routine (FIG. 13).

In this Modified Example 2, the final state flag fst is set based on the slip rate flag fstS and the vehicle motion state flag fstP. Thus, in Modified Example 2, the vehicle motion state flag fstP is set in accordance with the flowchart of FIG. 9, and the slip rate flag fstS is set in accordance with the flowchart of FIG. 12.

The brake ECU 53 executes the state flag setting routine illustrated in FIG. 13 under the state in which the vehicle motion state flag fstP and the slip rate flag fstS are set. In Step S151, the brake ECU 53 determines whether or not the vehicle motion state flag fstP is set to ON. When the vehicle motion state flag fstP is set to ON, in Step S152, the brake ECU 53 sets the state flag fst to ON. On the other hand, when the vehicle motion state flag fstP is set to OFF, in Step S153, the brake ECU 53 sets the state flag fst to OFF.

Then, in Step S154, the brake ECU 53 determines whether or not the regenerative braking execution rate Er is set to less than 1. When the regenerative braking execution rate Er is 1 (No in Step S154), the brake ECU 53 once finishes this routine. When the regenerative braking execution rate Er is set to less than 1 (Yes in Step S154), in Step S155, the brake ECU 53 determines whether or not the slip rate flag fstS is set to OFF. When the slip rate flag fstS is set to OFF (Yes in Step S155), that is, the wheel 10 is in the lock state, the brake ECU 53 sets the state flag fst to OFF. On the other hand, when the slip rate flag fstS is not set to OFF (No in Step S155), the brake ECU 53 once finishes this routine.

If the brake ECU 53 sets the state flag fst, the brake ECU 53 finishes the state flag setting routine, and advances the processing to Step S111 of the regenerative braking execution rate calculation routine (FIG. 8).

Figure 14A:
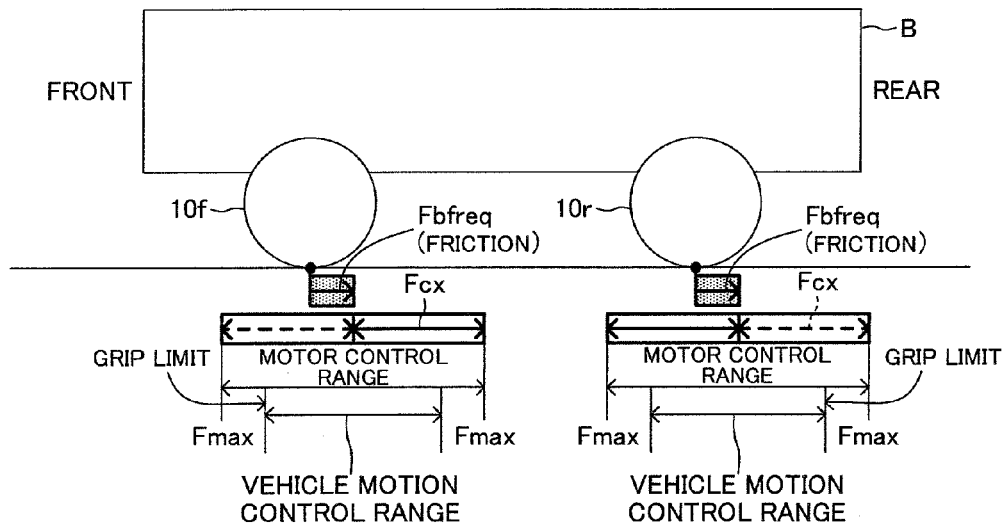
FIGS. 14A and 14B are schematic diagrams for illustrating vehicle motion control ranges (Modified Example 2).
Figure 14B:
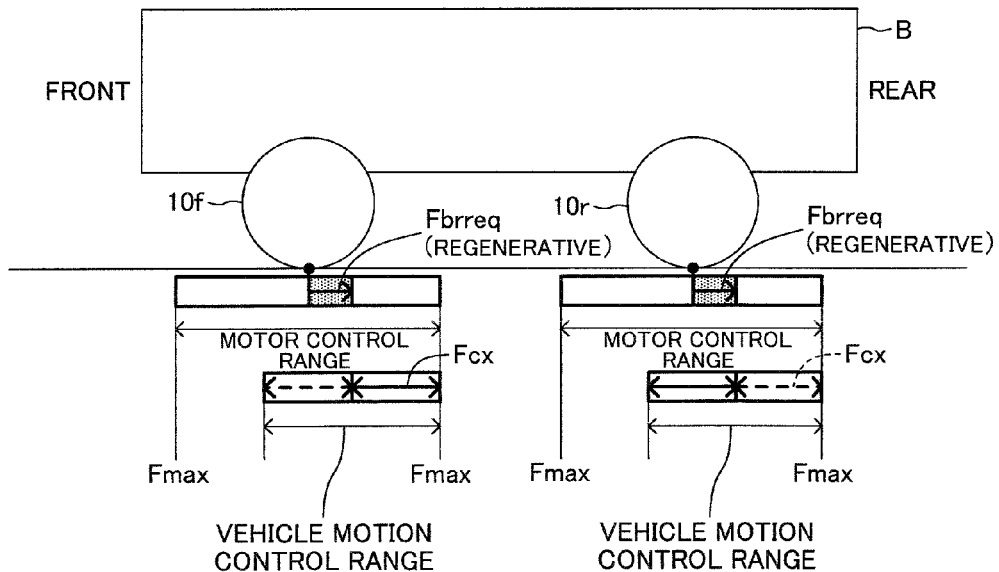

According to Modified Example 2 described above, when the state flag fst is set to ON, that is, the distribution characteristic is changed, and the wheel 10 is estimated to be in the lock state, the state flag fst is switched to OFF. Thus, independently of the vehicle motion state, the regenerative braking execution rate Er is adjusted to increase (recover). Therefore, the kinetic energy of the wheel 10, which was supposed to be lost by the friction braking, can be efficiently recovered to the battery 70 by the regenerative braking (from FIG. 14A to FIG. 14B). Moreover, when the wheel 10 is not in the lock state, and, as in the above-mentioned embodiment, the necessity for the vehicle motion control is high, the distribution ratio of the requested regenerative braking force Fbrreq is decreased, and the distribution ratio of the requested friction braking force Fbfreq is increased.

Note that, in Modified Example 2, the state in which the grip force of the tire is approaching the limit is determined based on the slip rate S, but the driver-requested braking force Fbreq may be used in place of the slip rate S. In this case, in Step S142, the brake ECU 53 determines whether or not the driver-requested braking force Fbreq is more than the OFF threshold Fbreqoff. When the brake ECU 53 determines that the driver-requested braking force Fbreq is more than the OFF threshold Fbreqoff, the brake ECU 53 only needs to estimate that the wheel 10 is almost in the lock state, and, in Step S143, to set the slip rate flag fstS to OFF. Thus, the OFF threshold Fbreqoff is set to a value close to the limit of the grip force of the tire. Moreover, in Step S144, the brake ECU 53 determines whether or not the driver-requested braking force Fbreq is less than the ON threshold Fbreqon. When the driver-requested braking force Fbreq is less than the ON threshold Fbreqon, in Step S145, the brake ECU 53 only needs to set the slip rate flag fstS to ON (fstS=ON).

Modified Example 3

Figure 15:
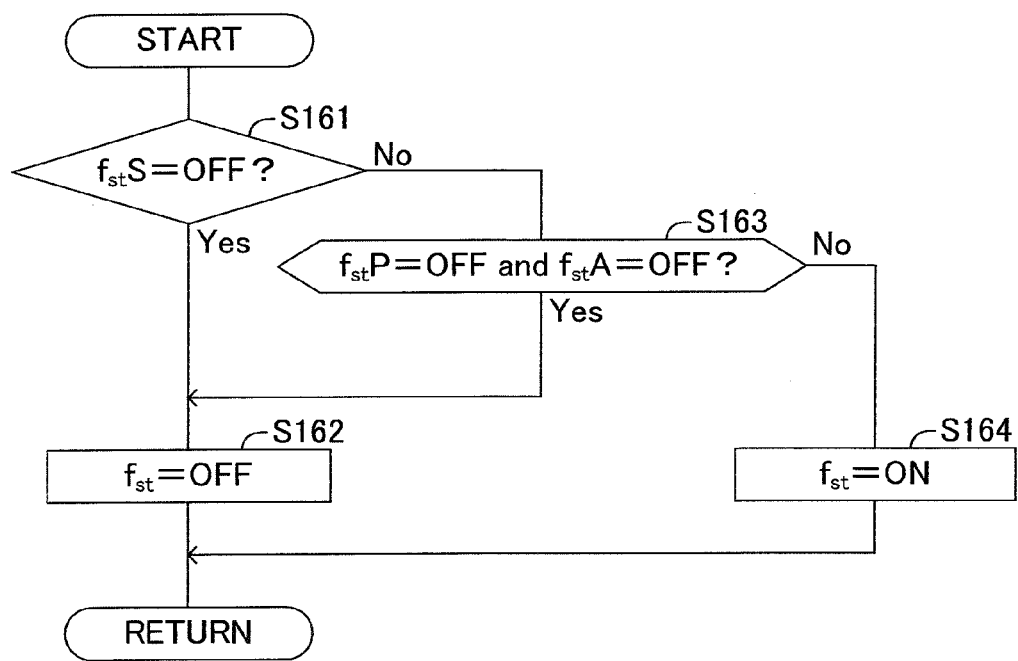
FIG. 15 is a flowchart for illustrating a state flag setting routine (Modified Example 3).

Modified Example 2 may be combined with Modified Example 1. In this case, the brake ECU 53 executes the vehicle motion state determination flag setting routine illustrated in FIG. 9, the motor torque usage rate flag setting routine illustrated in FIG. 10, and the slip rate flag setting routine illustrated in FIG. 12 to calculate the vehicle motion state flag fstP, the motor usage state flag fstA, and the slip rate flag fstS. Then, the brake ECU 53 uses those three types of flags to execute a state flag setting routine illustrated in FIG. 15.

When the state flag setting routine (FIG. 15) starts, in Step S161, the brake ECU 53 determines whether or not the slip rate flag fstS is set to OFF. When the slip rate flag fstS is set to OFF (Yes in Step S161), in Step S162, the brake ECU 53 sets the state flag fst to OFF. On the other hand, when the slip rate flag fstS is set to ON (No in Step S161), in Step S163, the brake ECU 53 determines whether or not the vehicle motion state flag fstP is set to OFF, and the motor usage state flag fstA is set to OFF. When both of the vehicle motion state flag fstP and the motor usage state flag fstA are set to OFF (Yes in Step S163), in Step S162, the brake ECU 53 sets the state flag fst to OFF. When at least any one of the vehicle motion state flag fstP and the motor usage state flag fstA is set to ON (No in Step S163), in Step S164, the brake ECU 53 sets the state flag fst to ON.

According to Modified Example 3, the actions and effects of both of the Modified Examples 1 and 2 are obtained.

Modified Example 4

Figure 16:
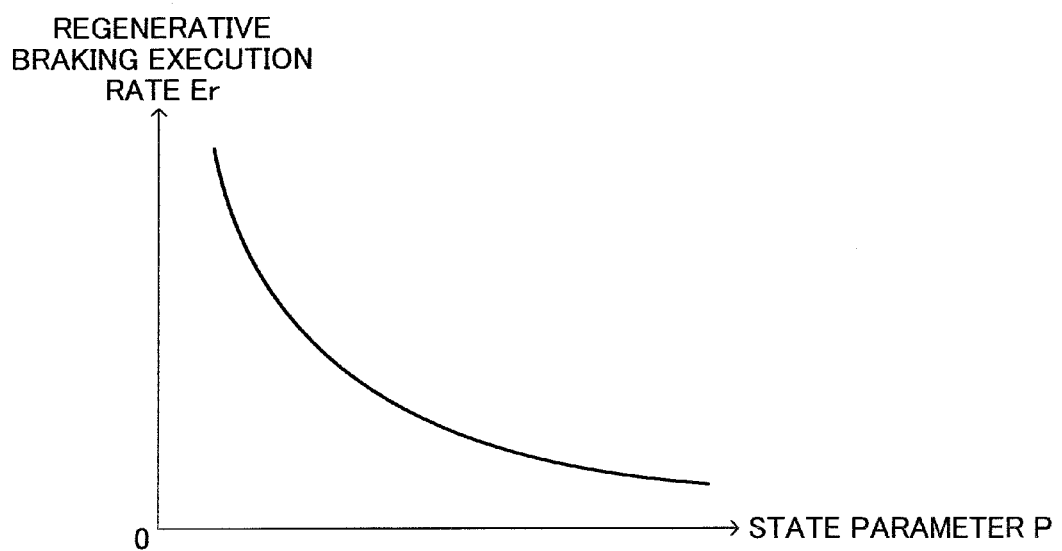
FIG. 16 is a graph for showing an execution rate map (Modified Example 4).

In this embodiment, the regenerative braking execution rate Er is adjusted to increase/decrease based on the state flag fst. Thus, the regenerative braking execution rate Er is adjusted to decrease while the state flag fst is set to ON, and can thus become zero. In contrast, in Modified Example 4, a target value of the regenerative braking execution rate Er is set. The brake ECU 53 stores association data (referred to as execution rate map) representing a relationship between the state parameter P and the regenerative braking execution rate Er as shown in FIG. 16, and determines the regenerative braking execution rate Er based on the execution rate map. The execution rate map has such a characteristic that as the state parameter P increases, the regenerative braking execution rate Er decreases, that is, such a characteristic that as the necessity for the vehicle motion control increases in the vehicle motion state, the regenerative braking execution rate Er decreases.

Figure 17:
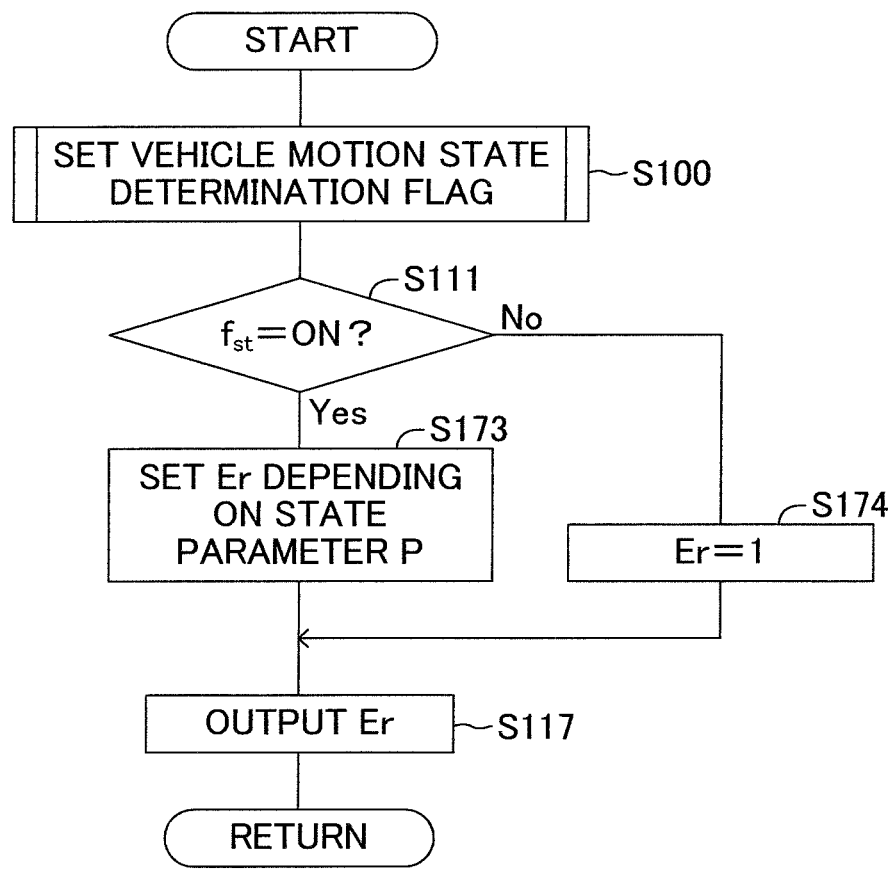
FIG. 17 is a flowchart for illustrating a regenerative braking execution rate calculation routine (Modified Example 4).

Thus, while the state flag fst is set to ON, the brake ECU 53 sets the regenerative braking execution rate Er based on the state parameter P based on the execution rate map. In this case, for example, the brake ECU 53 executes a regenerative braking execution rate calculation routine illustrated in FIG. 17. The regenerative braking execution rate calculation routine is acquired by providing Step S173 in place of the processing in Steps S112 and S113 of the regenerative braking execution rate calculation routine (FIG. 8) according to the embodiment, providing Step S174 in place of the processing in Steps S114, S115, and S116, and deleting the processing in Steps S118 and S119.

In Step S173, the brake ECU 53 sets the regenerative braking execution rate Er depending on the state parameter P based on the execution rate map. Moreover, when the state flag fst is set to OFF, in Step S174, the brake ECU 53 sets the regenerative braking execution rate Er to 1 (=100%). Note that, the regenerative braking execution rate Er only needs to be adjusted so as to approach a target value at a set speed set in advance.

According to Modified Example 4, the regenerative braking execution rate Er can be set based on the necessity for the vehicle motion control, and the vehicle motion control can be more appropriately carried out.

Modified Example 5

For example, if the steering angle is set as the state parameter P, even when the steering angle becomes less than the OFF threshold, the yaw motion of the vehicle does not settle at this time point, and a certain period is necessary until the yaw motion settles. Moreover, when a lane change is carried out, the steering angle crosses a zero point (neutral position) to an opposite direction. In this state, when the vehicle motion state determination flag setting routine (FIG. 9) according to the embodiment is used to set the state flag fst, the ON/OFF setting of the state flag fst may switch within a short period, and the regenerative braking execution rate Er may quickly increase or decrease. In this case, the driver may feel a sense of discomfort.

Figure 18:
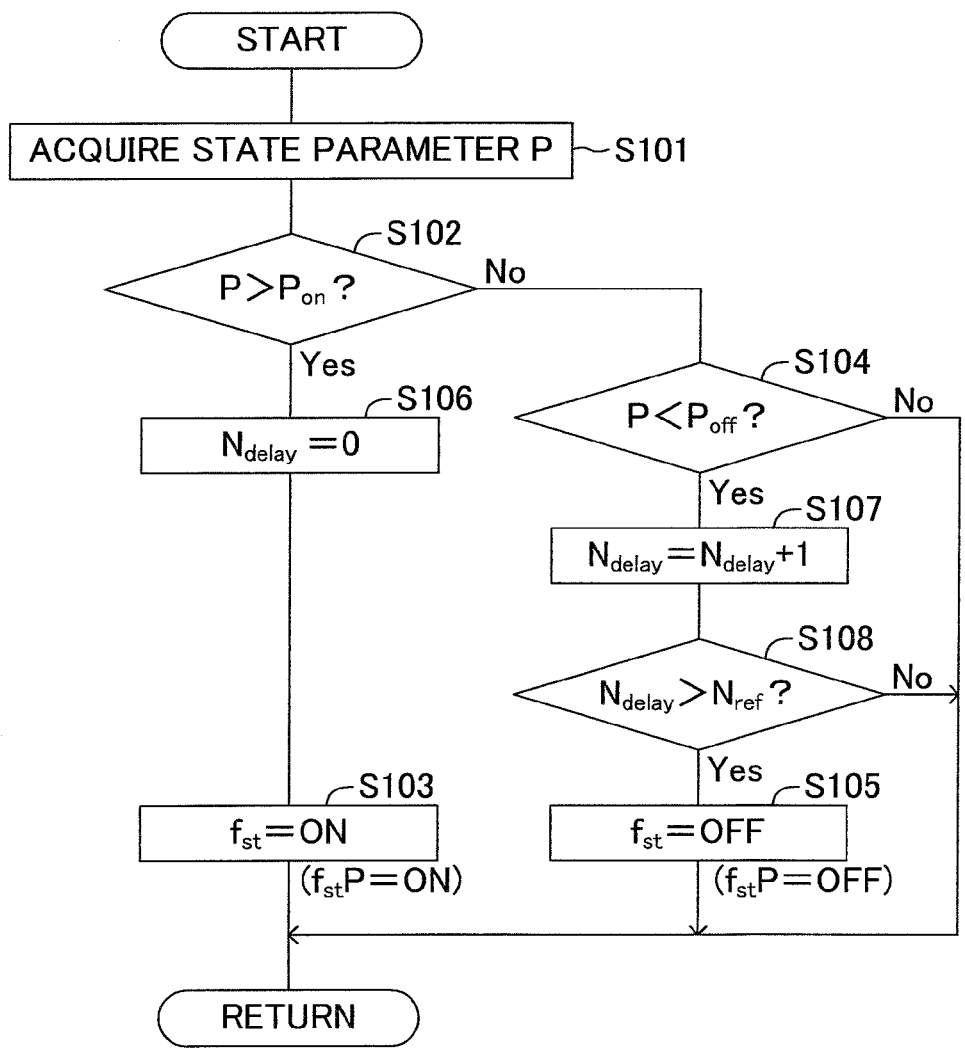
FIG. 18 is a flowchart for illustrating a vehicle motion state determination flag setting routine (Modified Example 5).

Thus, in Modified Example 5, when the steering angle is used as the state parameter P, after a time point when the state parameter P becomes equal to or less than the ON threshold Pon, until a state in which the state parameter P is not more than the ON threshold Pon continues for a period equal to or more than a set delay period, the state flag fst is set to OFF. The brake ECU 53 executes a vehicle motion state determination flag setting routine illustrated in FIG. 18 in place of the vehicle motion state determination flag setting routine (FIG. 9) according to the embodiment. The vehicle motion state determination flag setting routine according to Modified Example 5 is acquired by adding Steps S106, S107, and S108 to the vehicle motion state determination flag setting routine (FIG. 9) according to the embodiment.

When the state parameter P is more than the ON threshold Pon (Yes in Step S102), in Step S106, the brake ECU 53 clears a delay timer value Ndelay to zero, and, in Step S103, sets the state flag fst to ON. Moreover, when the state parameter P is less than the OFF threshold Poff (Yes in Step S104), in Step S107, the brake ECU 53 increments the delay timer value Ndelay by 1, and, in Step S108, determines whether or not the delay timer value Ndelay is more than a set value Nref. The set value Nref is set to a value corresponding to the set delay period. When the delay timer value Ndelay is not more than the set value Nref (No in Step S108), the brake ECU 53 skips the processing in Step S105. Thus, the state flag fst is not set to OFF.

When the delay timer value Ndelay is more than the set value Nref (Yes in Step S108), that is, when a state in which the state parameter P is less than the OFF threshold Poff continues for more than the set delay period, in Step S105, the brake ECU 53 sets the state flag fst to OFF. Note that, in this example, the delay timer value Ndelay is measurement of the period of the continuation of the state in which the state parameter P is less than the OFF threshold Poff, but the delay timer value Ndelay may be measurement of a period of the continuation of the state in which the state parameter P is not more than the ON threshold Pon. In other words, such a configuration only needs to be employed that after the state in which the state parameter P is not more than the ON threshold Pon continues for at least the set delay period, the state flag fst is set to OFF.

According to Modified Example 5, the state flag fst can be prevented from switching between ON and OFF within a short period, and the driver can be prevented from feeling a sense of discomfort.

Modified Example 6

In the embodiment described above, in Step S24 of the main brake control routine, the requested regenerative braking force Fbrreq and the requested friction braking force Fbfreq are directly calculated from the driver-requested braking force Fbreq, but, in place of this configuration, the distribution ratio of the requested regenerative braking force Fbrreq (or the distribution ratio of the requested friction braking force Fbfreq) may be calculated. For example, the brake ECU 53 stores distribution ratio data representing a relationship of a distribution ratio Kr of the requested regenerative braking force Fbrreq to the driver-requested braking force Fbreq (or a distribution ratio Kf of the requested friction braking force Fbfreq (Kf+Kr=1)), and, in Step S24, uses the distribution ratio data to calculate the distribution ratio Kr based on the driver-requested braking force Fbreq. The distribution ratio data may represent the characteristic shown in FIG. 6 with respect to the distribution ratio Kr (Kf).

Then, in Step S26, the brake ECU 53 multiplies the driver-requested braking force Fbreq by the distribution ratio Kr and the regenerative braking execution rate Er to acquire the corrected requested regenerative braking force Fbrreq* as shown by the following equation.

$$Fbrreq^* = Fbreq \times Kr \times Er$$

Modified Example 7

In the embodiment, a description is given of the braking force control apparatus for a vehicle applied to the vehicle in which the in-wheel motor 30 is provided for each of the front/rear left/right wheels 10, and the front/rear left/right wheels 10 are independently braked/driven, but the braking force control apparatus for a vehicle according to the present invention is not limited to the application to vehicles of this type. For example, the vehicle may be a rear wheel drive type of using a common motor to drive only the rear wheels 10r, a front wheel drive type of using a common motor to drive only the front wheels 10f, a one-motor four-wheel drive type of using a common motor to drive the front and rear wheels 10f and 10r (including the suspensions 20 different in the vertical force conversion rate between the front wheels and the rear wheels), and two-motor four-wheel drive type of using independent motors to drive the front left and right wheels 10f and the rear left and right wheels 10r.

For the type of using the common motor to drive the left and right wheels, braking/driving forces different in the magnitude cannot be generated on the left and right wheels, and the motion control cannot be thus carried out in a roll direction about a longitudinal axis passing through the center of gravity Cg of the vehicle and a yaw direction about a vertical axis passing through the center of gravity Cg of the vehicle. However, in the vehicle of the one-motor two-wheel drive type of using the motor, which is common in the left and right wheels, to drive any one of the front wheels 10f and the rear wheels 10r, the motion control can be carried out by controlling the braking/driving force in a pitch direction about a lateral axis passing through the center of gravity Cg of the vehicle. Thus, the pitch motion can be suppressed by estimating a pitch motion state of the vehicle, and controlling the braking/driving forces of the wheels 10 to generate a vertical force on the vehicle body B.

In this case, as in the embodiment, the sum of the control braking/driving forces Fcx of the four wheels cannot be zero, and the actual braking force increases/decreases by the amount of the control braking/driving force Fcx. Thus, the vehicle accelerates/decelerates in the longitudinal direction by the amount of the control braking/driving forces Fcx, and the pitch motion suppression control only needs to be carried out under a state in which a sense of discomfort caused by the pitch motion and felt by the driver is more than a sense of discomfort caused by the longitudinal acceleration and felt by the driver.

For the vehicle of the two-motor four-wheel drive type using the motors, which are common in the left and right wheels, to independently drive the front wheels 10f and the rear wheels 10r, the sum of the control braking/driving forces Fcx can be zero, and the above-mentioned problem does not exist. Moreover, the vertical forces can be controlled independently on the front wheels 10f and the rear wheels 10r, and hence the heave motion, which is a vertical motion at the center of gravity Cg of the vehicle, can be satisfactorily controlled.

Moreover, the braking force control apparatus for a vehicle can also be applied to a vehicle of the type providing four motors on the vehicle body to independently drive the front/rear left/right wheels 10. Moreover, the braking force control apparatus for a vehicle can also be applied to a vehicle of a two-motor rear wheel drive type of using two motors to independently drive the rear left and right wheels 10r and a two-motor front wheel drive type of using two motors to independently drive the front left and right wheels 10f.

Moreover, the braking force control apparatus for a vehicle can also be applied to a vehicle of the hybrid type of combining the motor and the engine to drive the wheels 10. In this case, the engine brake may be used to generate the braking force in place of or partially in place of the friction braking force by the friction brake mechanism 40. Thus, the distribution ratio of distributing the driver-requested braking force between the requested mechanical braking force, which is a sum of the friction braking force and the engine brake, and the requested regenerative braking force can be adjusted as described above.

Modified Example 8

In this embodiment, the driver-requested braking force generated by the brake pedal operation is distributed to the requested regenerative braking force and the requested friction braking force, but this distribution is carried out not only when the brake pedal is operated. For example, the requested braking force generated at the time of automatic braking during an autonomous travel operation, braking by carrying out traction control (TRC), braking by carrying out skid suppression control for suppressing a skid of the vehicle, and the like can be distributed to the requested regenerative braking force and the requested friction braking force as in the embodiment.

Modified Example 9

In this embodiment, the vehicle motion state amount or the operation state amount is set as the state parameter P, but, in place of or in addition to this setting, the magnitude of the control braking/driving force Fcx required for the vehicle motion control may be used as the state parameter P. In other words, the magnitude (absolute value) of the control braking/driving force Fcx is used as an index for predicting the state in which the control braking/driving force that can be generated by the motor 30 is liable to be insufficient. In this case, an average or the maximum value of the magnitudes (absolute values) of the control braking/driving forces Fcx of the four wheels may be employed. Thus, the ON threshold Pon is set to a value for predicting that the state in which the control braking/driving force that can be generated by the motor 30 may become insufficient exists. The OFF threshold Poff is set to a value for resetting (terminating) the determination that the state in which the control braking/driving force that can be generated by the motor 30 may become insufficient exists. According to Modified Example 9, the magnitudes of the control braking/driving forces Fcx are used to determine whether or not the state (specific state) in which the necessity for the vehicle motion control is high exists, and the determination is thus easy.

Some modified examples have been described, but the present invention may be embodied by combining those modified examples. For example, the Modified examples 4 and 9 may be combined to adjust the distribution ratio so that as the control braking/driving force Fcx increases, the regenerative braking execution rate Er decreases. In other words, the present invention may be embodied by using the control braking/driving force Fcx as the state parameter P represented as the horizontal axis of FIG. 16. Moreover the state parameter P may be set by combining, for example, at least one of the steering angle, the steering angular velocity, the lateral acceleration of the vehicle body, the yaw rate of the vehicle body, the sprung vertical acceleration, and the unsprung vertical acceleration and the control braking/driving force Fcx, and when one of those parameters is more than the ON threshold Pon, the state flag fst may be set to ON.

Moreover, in this embodiment, as the total requested braking force required in order to decelerate the vehicle, the driver-requested braking force set based on the acceleration operation amount of the driver is exemplified, but the total requested braking force is not limited to the driver-requested braking force. The total requested braking force may be, for example, the braking force required during the autonomous travel operation.

What is claimed is:

1. A braking force control apparatus for a vehicle, comprising:
   a motor configured to transmit a drive torque and a regenerative braking torque to a wheel to thereby generate a braking/driving force on the wheel;
   a mechanical brake device configured to apply a mechanical resistance to the wheel to thereby generate a braking force on the wheel; and
   an electronic control unit (ECU) configured to determine a total requested braking force, and distribute, based on the total requested braking force and in accordance with a distribution characteristic, a first distribution of a requested regenerative braking force to be generated by the motor, and a second distribution of a requested mechanical braking force to be generated by the mechanical brake device in order to decelerate the vehicle,
   wherein the ECU is further configured to calculate a target braking/driving force for the wheel to be generated by the motor based on the first distribution of the requested regenerative braking force distributed by the ECU and a control braking/driving force required for vehicle motion control, and control an operation of the motor based on the target braking/driving force,
   wherein the ECU is further configured to control an operation of the mechanical brake device based on the requested mechanical braking force,
   wherein the ECU is further configured to determine whether a specific state, in which a control braking/driving force that is generatable by the motor is insufficient for the control braking/driving force required for the vehicle motion control, has occurred,
   wherein, when the specific state is determined to have occurred under a state in which the total requested braking force is generated, the ECU is further configured to change the distribution characteristic such that the first distribution of the requested regenerative braking force decreases and the second distribution of the requested mechanical braking force determined by the distribution characteristic increases as compared with a state in which the specific state is not determined to have occurred,
   wherein the ECU is further configured to acquire a margin degree based on a margin of the regenerative braking torque that is additionally generatable by the motor,
   wherein the ECU is further configured to acquire an index for predicting the occurrence of the specific state, and determine, based on the index, whether or not the specific state has occurred,
   wherein the ECU is further configured to acquire, as the index, a vehicle state parameter representing a motion state of the vehicle or affecting the motion state, and
   wherein, when the margin degree is less than a margin degree threshold, the ECU is further configured to change the distribution characteristic of the total requested braking force such that the first distribution of the requested regenerative braking force decreases and the second distribution of the requested mechanical braking force increases.

2. The braking force control apparatus for a vehicle according to claim 1,
   wherein the ECU is further configured to acquire, as the vehicle state parameter, at least one of a steering angle, a steering velocity, a lateral acceleration of a vehicle body, a yaw rate of the vehicle body, a sprung vertical acceleration, or an unsprung vertical acceleration, and determine that the specific state has occurred when a magnitude of the acquired vehicle state parameter is greater than a determination threshold.

3. The braking force control apparatus for a vehicle according to claim 2,
   wherein the vehicle motion control includes at least one of sprung vibration suppression control of suppressing a vibration in a vertical direction of the vehicle body, roll motion control of suppressing a motion in a roll direction of the vehicle body, yaw motion control of controlling a motion in a yaw direction of the vehicle body, or pitch motion control of controlling a motion in a pitch direction of the vehicle body.

4. The braking force control apparatus for a vehicle according to claim 2,
   wherein the ECU is further configured to acquire at least the steering angle as the vehicle state parameter, and determine that the specific state has occurred when the steering angle is greater than a first threshold that corresponds to the determination threshold; and
   wherein, when the steering angle is equal to or less than a second threshold set to be a value less than the first threshold, the ECU is further configured to wait, after the specific state is determined to have occurred, for at least a set delay period and until a state in which the steering angle is less than the first threshold continues after the steering angle becomes equal to or less than the second threshold, and start an increase in the first distribution of the requested regenerative braking force and a decrease in the second distribution of the requested mechanical braking force such that the distribution characteristic is equal to the distribution characteristic before a change in the distribution characteristic.

5. The braking force control apparatus for a vehicle according to claim 1, wherein the ECU is further configured to acquire, as the index, a magnitude of the control braking/driving force required for the vehicle motion control, and determine that the specific state has occurred when the magnitude of the control braking/driving force is greater than a determination threshold.

6. The braking force control apparatus for a vehicle according to claim 2,
wherein the ECU is further configured to change the distribution characteristic such that, as the index increases, the first distribution of the requested regenerative braking force decreases, and the second distribution of the requested mechanical braking force increases.

7. The braking force control apparatus for a vehicle according to claim 1,
wherein the ECU is further configured to detect a lock state representing a state in which the wheel is estimated to be locked; and
wherein the ECU is further configured to start, under a state in which the distribution characteristic is changed by the ECU and when the lock state is detected by the ECU, an increase in the first distribution of the requested regenerative braking force, and a decrease in the second distribution of the requested mechanical braking force.

8. The braking force control apparatus for a vehicle according to claim 1,
wherein the motor is provided so as to transmit the driving torque and the regenerative braking torque independently to each of a front left wheel, a front right wheel, a rear left wheel, and a rear right wheel.

* * * * *